ns503B2" /> -->

(12) United States Patent
Ohdaira

(10) Patent No.: US 11,032,503 B2
(45) Date of Patent: Jun. 8, 2021

(54) SOLID-STATE IMAGING DEVICE AND INFORMATION PROCESSING DEVICE

(71) Applicant: SONY SEMICONDUCTOR SOLUTIONS CORPORATION, Kanagawa (JP)

(72) Inventor: Isao Ohdaira, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/607,830

(22) PCT Filed: Apr. 24, 2018

(86) PCT No.: PCT/JP2018/016588
§ 371 (c)(1),
(2) Date: Oct. 24, 2019

(87) PCT Pub. No.: WO2019/012779
PCT Pub. Date: Jan. 17, 2019

(65) Prior Publication Data
US 2020/0137335 A1    Apr. 30, 2020

(30) Foreign Application Priority Data
Jul. 11, 2017   (JP) ............................. JP2017-135398

(51) Int. Cl.
*H04N 5/374*     (2011.01)
*H04N 5/369*     (2011.01)
*H04L 9/08*      (2006.01)

(52) U.S. Cl.
CPC ........... *H04N 5/374* (2013.01); *H04L 9/0869* (2013.01); *H04N 5/379* (2018.08)

(58) Field of Classification Search
None
See application file for complete search history.

(56) References Cited

U.S. PATENT DOCUMENTS

| 2005/0190913 | A1  | 9/2005  | Vada et al. | |
|---|---|---|---|---|
| 2009/0262928 | A1* | 10/2009 | Busari | H04L 9/0861 380/46 |
| 2011/0102657 | A1* | 5/2011  | Takahashi | H01L 23/481 348/308 |

FOREIGN PATENT DOCUMENTS

| CN | 101384993 A | 3/2009 |
|---|---|---|
| CN | 102054849 A | 5/2011 |

(Continued)

OTHER PUBLICATIONS

International Search Report and Written Opinion of PCT Application No. PCT/JP2018/016588, dated Jul. 24, 2018, 09 pages of ISRWO.

*Primary Examiner* — Twyler L Haskins
*Assistant Examiner* — Fayez A Bhuiyan
(74) *Attorney, Agent, or Firm* — Chip Law Group

(57) ABSTRACT

A seed value of a random number is generated in a more preferable manner by utilizing characteristics of a solid-state imaging device. A solid-state imaging device includes a pixel array unit in which a plurality of pixels is arrayed, and a processing unit that generates a seed value of a random number on the basis of each pixel value of predetermined one or more target pixels of the plurality of pixels, in which the pixel array unit is arranged on a first substrate, the processing unit is arranged on a second substrate, and a plurality of substrates including at least the first substrate and the second substrate is stacked so that the second substrate is located in a lower layer than the first substrate.

8 Claims, 12 Drawing Sheets

(56) References Cited

FOREIGN PATENT DOCUMENTS

| | | |
|---|---|---|
| EP | 1821196 A1 | 8/2007 |
| EP | 2317558 A2 | 5/2011 |
| JP | 2001-051831 A | 2/2001 |
| JP | 2009-527012 A | 7/2009 |
| JP | 2011-096851 A | 5/2011 |
| JP | 2014-062941 A | 4/2014 |
| KR | 10-2008-0108230 A | 12/2008 |
| KR | 10-2011-0047133 A | 5/2011 |
| WO | 2007/093347 A2 | 8/2007 |

* cited by examiner

FIG. 3
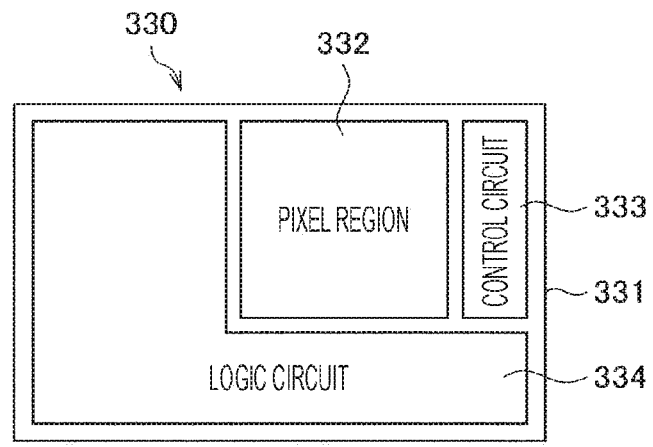
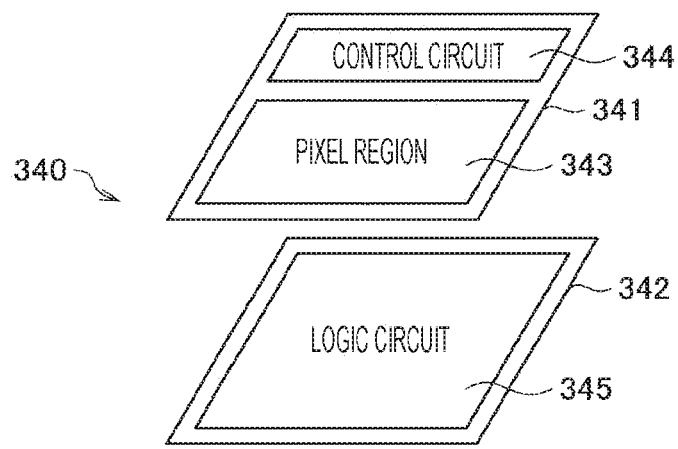
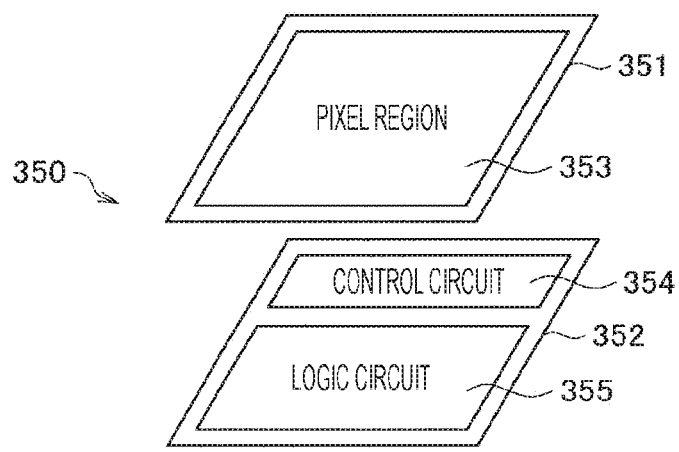

SOLID-STATE IMAGING DEVICE AND INFORMATION PROCESSING DEVICE

CROSS REFERENCE TO RELATED APPLICATIONS

This application is a U.S. National Phase of International Patent Application No. PCT/JP2018/016588 filed on Apr. 24, 2018, which claims priority benefit of Japanese Patent Application No. JP 2017-135398 filed in the Japan Patent Office on Jul. 11, 2017. Each of the above-referenced applications is hereby incorporated herein by reference in its entirety.

TECHNICAL FIELD

The present disclosure relates to a solid-state imaging device and an information processing device.

BACKGROUND ART

As a solid-state imaging device, an amplification-type solid-state imaging device represented by a MOS type image sensor such as a complementary metal oxide semiconductor (CMOS) is known. Furthermore, a charge transfer type solid-state imaging device represented by a charge coupled device (CCD) image sensor is known. These solid-state imaging devices are widely used in digital still cameras, digital video cameras, and the like. Furthermore, as a solid-state imaging device mounted on a mobile device such as a camera-equipped mobile phone or a personal digital assistant (PDA), a MOS type image sensor is often used from the viewpoint of low power supply voltage and power consumption.

CITATION LIST

Patent Document

Patent Document 1: Japanese Patent Application Laid-Open No. 2014-62941

SUMMARY OF THE INVENTION

Problems to be Solved by the Invention

By the way, in recent years, demand for electronic signatures using encryption is increasing from the viewpoint of security enhancement and copyright protection. In generating a cipher used for an electronic signature, for example, there is a case where a random number is used as an encryption key. For example, Patent Document 1 discloses an example of a technology for generating a random number used for an encryption key.

The above-described technology related to electronic signatures is, for example, expected to be applied to protection of various information such as image data output from a solid-state imaging device. Furthermore, it is known that the use of random numbers having higher randomness works more effectively for improving security in generating a cipher used for an electronic signature.

Therefore, the present disclosure proposes a technology capable of generating a seed value of a random number in a more preferable manner using the characteristics of the solid-state imaging device.

Solutions to Problems

According to the present disclosure, provided is a solid-state imaging device including: a pixel array unit in which a plurality of pixels is arrayed; and a processing unit that generates a seed value of a random number on the basis of each pixel value of predetermined one or more target pixels of the plurality of pixels, in which the pixel array unit is arranged on a first substrate, the processing unit is arranged on a second substrate, and a plurality of substrates including at least the first substrate and the second substrate is stacked so that the second substrate is located in a lower layer than the first substrate.

Furthermore, according to the present disclosure, provided is an information processing device including: an acquisition unit that acquires an image signal corresponding to each of predetermined one or more target pixels in a pixel region in which a plurality of pixels is arrayed; and a processing unit that generates a seed value of a random number on the basis of each pixel value of the one or more target pixels corresponding to the image signal.

Effects of the Invention

As described above, according to the present disclosure, there is provided a technology capable of generating a seed value of a random number in a more preferable manner using the characteristics of the solid-state imaging device.

Note that the effect described above is not necessarily limitative, and any of the effects shown in the present specification or other effects that can be understood from the present specification may be exhibited together with the effect described above, or instead of the effect described above.

BRIEF DESCRIPTION OF DRAWINGS

FIG. 3 is a diagram showing an outline of a configuration example of a stacked solid-state imaging device to which the technology according to the present disclosure can be applied.

MODE FOR CARRYING OUT THE INVENTION

Figure 1:
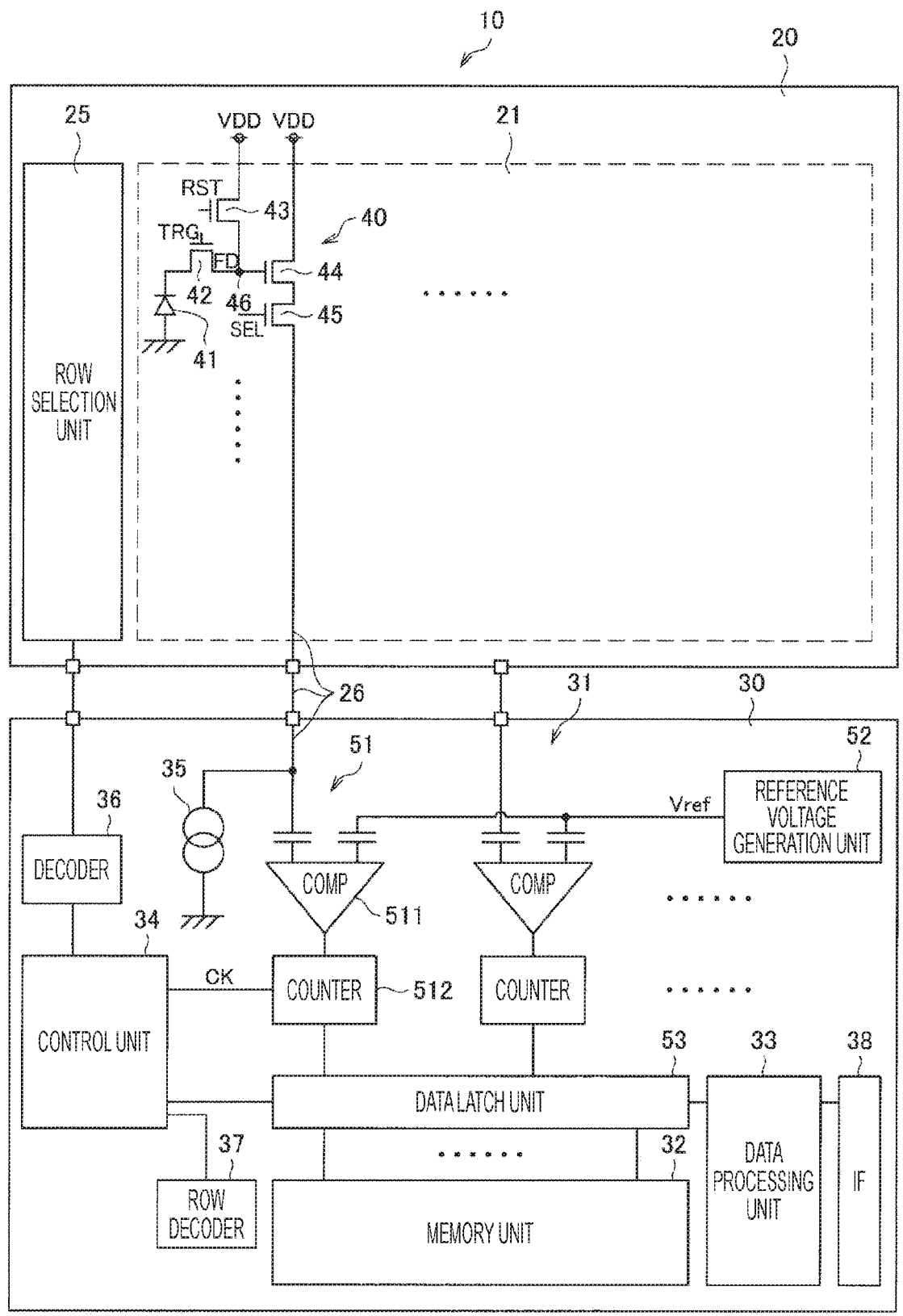
FIG. 1 is an explanatory diagram for explaining an example of a schematic circuit configuration of a solid-state imaging device according to an embodiment of the present disclosure.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Note that the description will be given in the following order.

1. Configuration Example of Solid-State Imaging Device
1.1 Schematic Configuration of Solid-State Imaging Device
1.2. Schematic Configuration of Stacked Solid-State Imaging Device
2. Study on Application of Electronic Signature
3. Technical Features
3.1. Functional Configuration
3.2 Details of Configuration Related to Seed Value Generation
3.3. Processing
4. Application Example
4.1 Application Example to Endoscopic Surgery System
4.2 Application Example to Mobile Body
5. Conclusion

1. CONFIGURATION EXAMPLE OF SOLID-STATE IMAGING DEVICE

Hereinafter, an example of the configuration of a solid-state imaging device according to an embodiment of the present disclosure will be described.

<1.1 Schematic Configuration of Solid-State Imaging Device>

First, an example of a schematic configuration of the solid-state imaging device according to an embodiment of the present disclosure will be described with reference to FIGS. 1 and 2. For example, FIG. 1 is an explanatory diagram for explaining an example of a schematic circuit configuration of a solid-state imaging device according to the present embodiment. Note that, in the present description, a solid-state imaging device 10 according to the present embodiment will be described as a configuration in which a first substrate 20 and a second substrate 30 are stacked.

(Configuration Example on First Substrate Side)

First, the circuit configuration on the first substrate 20 side will be described with reference to FIG. 1. On the first substrate 20 side, in addition to a pixel array unit 21 in which unit pixels 40 are arranged in a matrix, a row selection unit 25 that selects each pixel 40 of the pixel array unit 21 in units of rows on the basis of an address signal given from the second substrate 30 side is provided. Note that, here, the configuration in which the row selection unit 25 is provided on the first substrate 20 side is described, but a configuration in which the row selection unit 25 is provided on the second substrate 30 side is also possible.

As shown in FIG. 1, the unit pixel 40 has, for example, a photodiode 41 as a photoelectric conversion element. In addition to the photodiode 41, the unit pixel 40 includes four transistors, for example, a transfer transistor (transfer gate) 42, a reset transistor 43, an amplification transistor 44, and a selection transistor 45.

Here, as the four transistors 42 to 45, for example, N-channel transistors are used. However, the conductivity type combinations of the transfer transistor 42, the reset transistor 43, the amplification transistor 44, and the selection transistor 45 illustrated here are merely examples, and are not limited to these combinations. In other words, a combination using P-channel transistors can be used as necessary.

A transfer signal TRG, a reset signal RST, and a selection signal SEL, which are drive signals for driving the pixel 40 described above, are appropriately supplied from the row selection unit 25 to the unit pixel 40. In other words, the transfer signal TRG is applied to the gate electrode of the transfer transistor 42, the reset signal RST is applied to the gate electrode of the reset transistor 43, and the selection signal SEL is applied to the gate electrode of the selection transistor 45.

The photodiode 41 has an anode electrode connected to a low-potential power supply (for example, ground), photoelectrically converts received light (incident light) into photocharge (here, photoelectrons) with a charge amount corresponding to the amount of light, and accumulates the photocharge. A cathode electrode of the photodiode 41 is electrically connected to the gate electrode of the amplification transistor 44 through the transfer transistor 42. A node 46 electrically connected to the gate electrode of the amplification transistor 44 is referred to as a floating diffusion/floating diffusion region (FD) unit.

The transfer transistor 42 is connected between the cathode electrode of the photodiode 41 and the FD unit 46. A transfer signal TRG whose high level (for example, VDD level) is active (hereinafter, referred to as "high active") is supplied from the row selection unit 25 to the gate electrode of the transfer transistor 42. In response to the transfer signal TRG, the transfer transistor 42 becomes conductive, and the photoelectric charge photoelectrically converted by the photodiode 41 is transferred to the FD unit 46.

The reset transistor 43 has a drain electrode connected to the pixel power supply VDD and a source electrode connected to the FD unit 46. A high active reset signal RST is supplied from the row selection unit 25 to the gate electrode of the reset transistor 43. In response to the reset signal RST, the reset transistor 43 becomes conductive, and the FD unit 46 is reset by throwing away the charge of the FD unit 46 to the pixel power supply VDD.

The amplification transistor 44 has a gate electrode connected to the FD unit 46 and a drain electrode connected to the pixel power supply VDD. Then, the amplification transistor 44 outputs the potential of the FD unit 46 after being reset by the reset transistor 43 as a reset signal (reset level) Vreset. Moreover, the amplification transistor 44 outputs the potential of the FD unit 46 after the signal charge is transferred by the transfer transistor 42 as a light accumulation signal (signal level) Vsig.

For example, the selection transistor 45 has a drain electrode connected to the source electrode of the amplification transistor 44 and a source electrode connected to the signal line 26. A high active selection signal SEL is supplied from the row selection unit 25 to the gate electrode of the selection transistor 45. In response to the selection signal SEL, the selection transistor 45 becomes conductive, and the signal output from the amplification transistor 44 is read out to the signal line 26 with the unit pixel 40 selected.

As is clear from the above description, from the unit pixel 40, the potential of the FD unit 46 after reset is read out as the reset level Vreset, and the potential of the FD unit 46 after transfer of the signal charge is read out as the signal level Vsig, sequentially to the signal line 26. Incidentally, the signal level Vsig also includes a component of the reset level Vreset.

Note that, here, the selection transistor 45 has a circuit configuration connected between the source electrode of the amplification transistor 44 and the signal line 26. However, the circuit configuration connected between the pixel power supply VDD and the drain electrode of the amplification transistor 44 is also possible.

Furthermore, the unit pixel 40 is not limited to the pixel configuration including four transistors described above. For example, a pixel configuration including three transistors in which the amplification transistor 44 has the function of the selection transistor 45, or a pixel configuration in which the transistors after the FD unit 46 are shared between a plurality of photoelectric conversion elements (between pixels) may be used, and there is no limitation on the configuration of the pixel circuit.

(Circuit Configuration on Second Substrate Side)

Next, the circuit configuration on the second substrate 30 side will be described with reference to FIG. 1. On the second substrate 30 side, in addition to the signal processing unit 31, the memory unit 32, the data processing unit 33, and the control unit 34 described above, a current source 35, a decoder 36, a row decoder 37, and an interface (IF) unit 38 and the like are provided.

The current source 35 is connected to each signal line 26 from which a signal is read out from each pixel 40 of the pixel array unit 21 for each pixel column. The current source 35 has, for example, a so-called load MOS circuit configuration including a MOS transistor whose gate potential is biased to a constant potential so as to supply a certain current to the signal line 26. The current source 35 including the load MOS circuit supplies the constant current to the amplification transistor 44 of the unit pixel 40 in the selected row, thereby operating the amplification transistor 44 as a source follower.

When the decoder 36 selects each pixel 40 of the pixel array unit 21 in units of rows under the control of the control unit 34, the decoder 36 supplies an address signal for designating the address of the selected row to the row selection unit 25. The row decoder 37 designates a row address in writing pixel data to the memory unit 32 or reading pixel data from the memory unit 32 under the control of the control unit 34.

The signal processing unit 31 includes at least an AD converter 51 that digitizes (AD converts) an analog pixel signal read out from each pixel 40 of the pixel array unit 21 through the signal line 26, and is configured to perform signal processing (row parallel AD) in parallel in units of pixel columns with respect to the analog pixel signal.

The signal processing unit 31 further includes a reference voltage generation unit 52 that generates a reference voltage used when AD conversion is performed by the AD converter 51. The reference voltage generation unit 52 generates a reference signal of a so-called ramp waveform (gradient waveform) in which a voltage value changes stepwise as time elapses. The reference voltage generation unit 52 can be configured using, for example, a digital-analog conversion (DAC) circuit.

The AD converter 51 is provided for each pixel column of the pixel array unit 21, in other words, for each signal line 26, for example. In other words, the AD converter 51 is a so-called column-parallel AD converter that is arranged by the number of pixel columns of the pixel array unit 21. Then, the AD converter 51 generates, for example, a pulse signal having a magnitude (pulse width) in the time axis direction corresponding to the magnitude of the level of the pixel signal, and measures the length of the pulse width period of the pulse signal to perform AD conversion processing.

Figure 2:
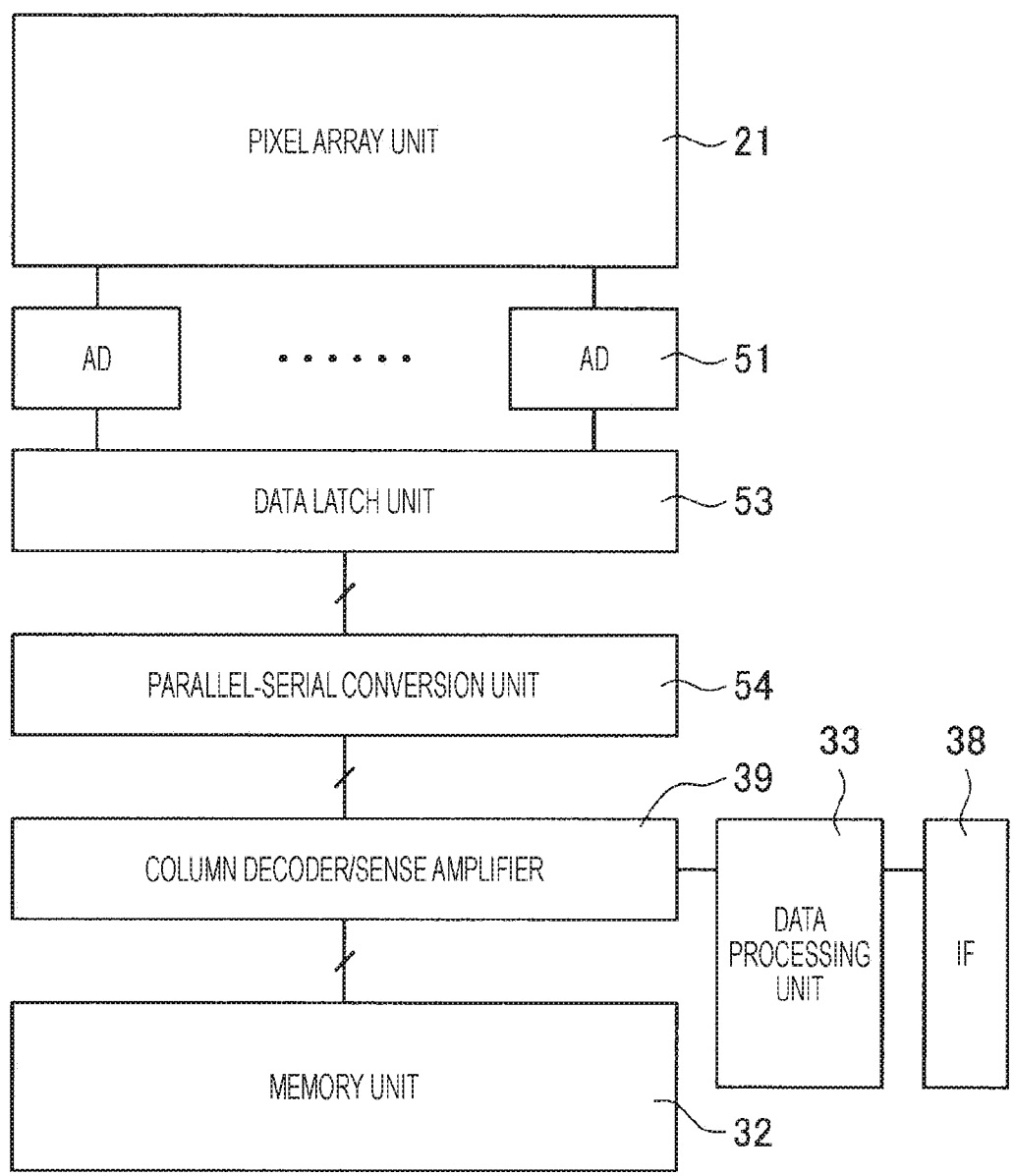
FIG. 2 is a block diagram showing an example of a configuration of a signal processing unit in the solid-state imaging device according to the embodiment.

More specifically, as shown in FIG. 2, the AD converter 51 includes at least a comparator (COMP) 511 and a counter 512. The comparator 511 uses the analog pixel signal (the signal level Vsig and the reset level Vreset described above) read from each pixel 40 of the pixel array unit 21 through the signal line 26 as a comparison input, and the reference voltage Vref of the ramp wave supplied from the reference voltage generation unit 52 as a reference input, and compares both inputs.

Then, the output of the comparator 511 becomes a first state (for example, high level) when the reference voltage Vref is larger than the pixel signal, and becomes a second state (for example, low level) when the reference voltage Vref is equal to or lower than the pixel signal, for example. The output signal of the comparator 511 becomes a pulse signal having a pulse width corresponding to the magnitude of the level of the pixel signal.

For example, an up/down counter is used as the counter 512. The counter 512 is supplied with a clock CK at the same timing as the supply start timing of the reference voltage Vref to the comparator 511. The counter 512, which is an up/down counter, performs a down (DOWN) count or an up (UP) count in synchronization with the clock CK to measure the pulse width period of the output pulse of the comparator 511, that is, the comparison period from the start to the end of the comparison operation. During this measurement operation, with respect to the reset level Vreset and the signal level Vsig read in order from the unit pixel 40, the counter 512 performs down count on the reset level Vreset and up count on the signal level Vsig.

By this down count/up count operation, the difference between the signal level Vsig and the reset level Vreset can be obtained. As a result, the AD converter 51 performs correlated double sampling (CDS) processing in addition to the AD conversion processing. Here, the "CDS processing" is processing for removing fixed pattern noise unique to a pixel such as reset noise of the unit pixel 40 and threshold variation of the amplification transistor 44 by taking a difference between the signal level Vsig and the reset level Vreset. Then, the count result (count value) of the counter 512 is a digital value obtained by digitizing the analog pixel signal.

(Example of Configuration of Signal Processing Unit)

Next, an example of the configuration of the signal processing unit 31 in the solid-state imaging device 10 according to the present embodiment will be described. FIG. 2 is a block diagram showing an example of a configuration of the signal processing unit 31 in the solid-state imaging device 10 according to the present embodiment.

The signal processing unit 31 shown in FIG. 2 includes a data latch unit 53 and a parallel-serial conversion unit 54 in addition to the AD converter 51, and has a pipeline configuration in which pixel data digitized by the AD converter 51 is pipe line transferred to the memory unit 32. At that time, the signal processing unit 31 performs digitization processing by the AD converter 51 within one horizontal period, and performs processing of transferring the digitized pixel data to the data latch unit 53 within the next one horizontal period.

On the other hand, the memory unit 32 is provided with a column decoder/sense amplifier 39 as its peripheral circuit. The above-described row decoder 37 (see FIG. 1) designates a row address for the memory unit 32, whereas the column decoder designates a column address for the memory unit 32. Furthermore, the sense amplifier amplifies a weak voltage read from the memory unit 32 through the bit line to a level that can be handled as a digital level. Then, the pixel data read through the column decoder/sense amplifier 39 is output to the outside of the second substrate 30 via the data processing unit 33 and the interface unit 38.

Note that, here, the case where there is one column-parallel AD converter 51 is taken as an example, but the present invention is not limited to this, and a configuration in which two or more AD converters 51 are provided, and digitization processing is performed in parallel in these two or more AD converters 51 is possible.

In this case, the two or more AD converters 51 are arranged separately in the extending direction of the signal line 26 of the pixel array unit 21, in other words, on both the upper and lower sides of the pixel array unit 21. In a case where two or more AD converters 51 are provided, the data latch unit 53, the parallel-serial conversion unit 54, the memory unit 32, and the like are also provided by two (two systems) or more correspondingly.

In this way, in a solid-state imaging device having a configuration in which, for example, two systems of AD converters 51 are provided, row scanning is performed in units of two pixel rows. Then, the signal of each pixel in one pixel row is read out on one side in the vertical direction of the pixel array unit 21, and the signal of each pixel in the other pixel row is read out on the other side in the vertical direction of the pixel array unit 21, and digitization processing is performed in parallel by the two AD converters 51. Subsequent signal processing is also performed in parallel. As a result, pixel data can be read at a higher speed than when row scanning is performed in units of one pixel row.

An example of a schematic configuration of the solid-state imaging device according to an embodiment of the present disclosure is described above with reference to FIGS. 1 and 2.

<1.2. Schematic Configuration of Stacked Solid-State Imaging Device>

Next, an outline of a configuration example of a stacked solid-state imaging device to which the technology according to the present disclosure can be applied will be described with reference to FIG. 3. FIG. 3 is a diagram illustrating an outline of a configuration example of a stacked solid-state imaging device to which the technology according to the present disclosure can be applied.

First, the diagram shown in the upper part of FIG. 3 shows a schematic configuration example of a non-stacked solid-state imaging device. Specifically, the solid-state imaging device 330 shown in the upper part of FIG. 3 has one die (semiconductor substrate) 331. Furthermore, the die 331 is mounted with a pixel region 332 in which pixels are arranged in an array, a control circuit 333 that performs various other controls such as pixel driving, and a logic circuit 334 for signal processing.

On the other hand, the diagram shown in the middle and lower part of FIG. 3 shows a schematic configuration example of a stacked solid-state imaging device.

For example, the solid-state imaging device 340 shown in the middle part of FIG. 3 is configured as a single semiconductor chip in which two dies of a sensor die 341 and a logic die 342 are stacked and electrically connected. The sensor die 341 is mounted with a pixel region 343 and a control circuit 344, and the logic die 342 is mounted with a logic circuit 345 including a signal processing circuit that performs signal processing. Note that, in this case, the sensor die 341 corresponds to an example of the "first substrate", and the logic die 342 corresponds to an example of the "second substrate".

Furthermore, the solid-state imaging device 350 shown in the lower part of FIG. 3 is configured as a single semiconductor chip in which two dies of a sensor die 351 and a logic die 352 are stacked and electrically connected. The sensor die 351 is mounted with a pixel region 353, and the logic die 353 is mounted with a control circuit 354 and a logic circuit 355 including the signal processing circuit described above. Note that, in this case, the sensor die 351 corresponds to an example of the "first substrate", and the logic die 352 corresponds to an example of the "second substrate".

Note that, in the above description, an example of a stacked solid-state imaging device in which two dies are stacked to form one semiconductor chip has been described. However, the configuration of the solid-state imaging device according to the present embodiment is not limited to the configuration described above. For example, three or more dies may be stacked to form one semiconductor chip.

An outline of a configuration example of a stacked solid-state imaging device to which the technology according to the present disclosure can be applied is described above with reference to FIG. 3.

2. STUDY ON APPLICATION OF ELECTRONIC SIGNATURE

In recent years, demand for digital signatures using encryption is increasing from the viewpoint of security enhancement and copyright protection. Furthermore, in generating a cipher used for an electronic signature as described above, for example, there is a case where a random number is used as an encryption key. As a method for generating the random number described above, for example, a method using thermal noise generated in an output from a predetermined device, a method using an indefinite circuit, and the like are generally known.

In particular, in recent years, the above-described technology related to electronic signatures is, for example, expected to be applied to protection of various information such as image data output from a solid-state imaging device. Furthermore, it is known that the use of random numbers having higher randomness works more effectively for improving security in generating a cipher used for an electronic signature.

In view of the situation as described above, the present disclosure proposes a technology capable of generating a seed value of a random number in a more preferable manner using the characteristics of the solid-state imaging device.

3. TECHNICAL FEATURES

Hereinafter, technical features of a solid-state imaging device according to an embodiment of the present disclosure will be described.

<3.1. Functional Configuration>

Figure 4:
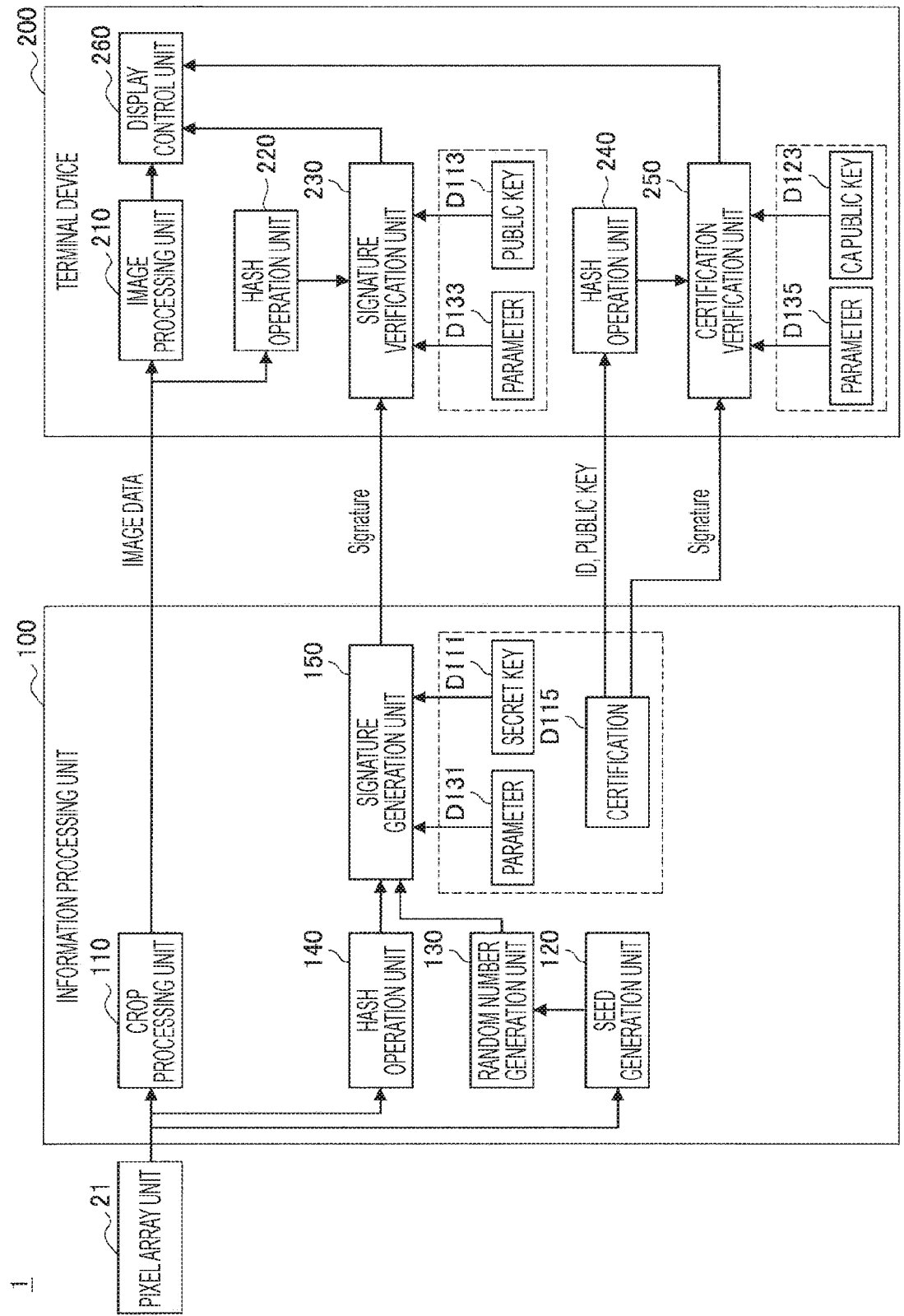
FIG. 4 is a block diagram showing an example of a schematic functional configuration of a system to which the solid-state imaging device according to the embodiment is applied.

First, an example of a schematic configuration of a system to which the solid-state imaging device according to the present embodiment is applied will be described by focusing particularly on a part related to generation of an electronic signature and verification of the electronic signature. FIG. 4 is a block diagram showing an example of a schematic functional configuration of a system to which the solid-state imaging device according to the present embodiment is applied.

As shown in FIG. 4, the system 1 according to the present embodiment includes the pixel array unit 21, the information processing unit 100, and the terminal device 200. Note that the pixel array unit 21 and the information processing unit 100 correspond to the solid-state imaging device 10 according to the present embodiment. Specifically, the pixel array unit 21 corresponds to the pixel array unit 21 shown in FIG. 1. Furthermore, the information processing unit 100 corresponds to at least a part of the data processing unit 33 shown in FIG. 1. Note that, in the example shown in FIG. 4, in order to make the characteristics of the system according to the present embodiment easier to understand, illustration of some of the configurations of the solid-state imaging device, such as the configuration related to pixel signal processing of the pixel signal, for example, is omitted. In other words, in this description, it is assumed that pixel data after various signal processing is performed on the pixel signal output from each pixel is output from the pixel array unit 21 shown in FIG. 4.

(Information Processing Device 100)

First, the configuration of the information processing unit 100 will be described. As shown in FIG. 4, the information processing unit 100 includes a crop processing unit 110, a seed generation unit 120, a random number generation unit 130, a hash operation unit 140, and a signature generation unit 150. Furthermore, in a predetermined storage region of the information processing unit 100, a secret key D111 and a parameter D131 used for generating an electronic signature and a certification D115 corresponding to the secret key D111 are held in a readable manner.

The crop processing unit 110 cuts out pixel data of a region to be displayed from the pixel data for every pixel output from the pixel array unit 21, and outputs the cut out data to the outside (for example, the terminal device 200) as image data.

By setting at least some of the plurality of pixels included in the pixel array unit 21 (predetermined one or more pixels) as the target pixels, the seed generation unit 120 acquires pixel data of the target pixel from the pixel array unit 21. Note that all the pixels included in the pixel array unit 21 may be set as target pixels, or only some of the pixels may be set as target pixels. Furthermore, the pixels of an optical black region and an invalid region may be included in the target pixels.

The seed generation unit 120 generates, on the basis of the pixel value indicated by the pixel data corresponding to the acquired target pixel described above, a seed value having a bit length corresponding to the number of bits larger than the number of bits corresponding to the bit depth of the pixel value. The seed value is used for generating a random number. Note that the bit length of the seed value is not particularly limited as long as the condition regarding the relationship between the bit depth of the pixel value and the bit length of the generated seed value is satisfied. As a specific example, in a case where the bit depth of the pixel value is about 8, 12, and 14 bits, the bit length of the seed value may be, for example, any of 32, 64, 128, 256, and 512 bits. Details of the operation of the seed generation unit 120 (particularly, processing related to generation of a seed value) will be described later. Then, the seed generation unit 120 outputs information indicating the generated seed value to the random number generation unit 130.

The random number generation unit 130 corresponds to a so-called random number generator. The random number generation unit 130 acquires information indicating the seed value from the seed generation unit 120, and generates a random number having a predetermined bit length on the basis of the seed value. Note that as long as a random number is generated on the basis of the obtained seed value (in other words, a seed value based on the pixel value of the target pixel), the method and configuration related to the generation of the random number are not particularly limited. Then, the random number generation unit 130 outputs information indicating the generated random number to the signature generation unit 150.

The hash operation unit 140 calculates a hash value on the basis of pixel data of at least some of the pixels output to the outside as image data among the pixel data for every pixel output from the pixel array unit 21. The hash value is used for generation of an electronic signature by the signature generation unit 150 described later. Furthermore, the hash value may be used by another device (for example, the terminal device 200) to verify the validity of the data of the electronic signature generated by the signature generation unit 150 described later. The hash operation unit 140 outputs information indicating the calculated hash value to the signature generation unit 150.

The signature generation unit 150 acquires information indicating the random number generated from the random number generation unit 130. Furthermore, the signature generation unit 150 acquires information indicating the hash value calculated by the hash operation unit 140 from the hash operation unit 140. The signature generation unit 150 generates an electronic signature on the basis of the acquired random number and hash value, and the secret key D111 and parameter D131 held in a predetermined storage region. Note that, in this description, it is assumed that an algorithm called an elliptic curve digital signature algorithm (DSA) is used for generating an electronic signature. However, the generation algorithm is not necessarily limited to the elliptic curve DSA as long as an electronic signature can be generated on the basis of a random number corresponding to the seed value according to the present embodiment. Note that, in a case where another generation algorithm is used, information necessary for generating the electronic signature may be appropriately changed according to the generation algorithm.

The secret key D111 corresponds to one of a pair of keys generated on the basis of a so-called public key encryption technology. Furthermore, the certification D115 is data for verifying the validity of the public key (public key D113 shown in FIG. 4) that forms a pair with the secret key D111. The certification D115 includes, for example, the public key D113 and information for certifying its owner, and the like. Furthermore, the validity of the certification D115 is verified on the basis of a CA public key D123.

Here, with reference to FIG. 5, the outline of the public key encryption technology will be described to explain the generation method and the role of each of the secret key D111, public key D113, certification D115, and CA public key D123. For example, FIG. 5 is an explanatory diagram for explaining an overview of processing related to generation of key information based on the public key cryptography technology.

Figure 5:
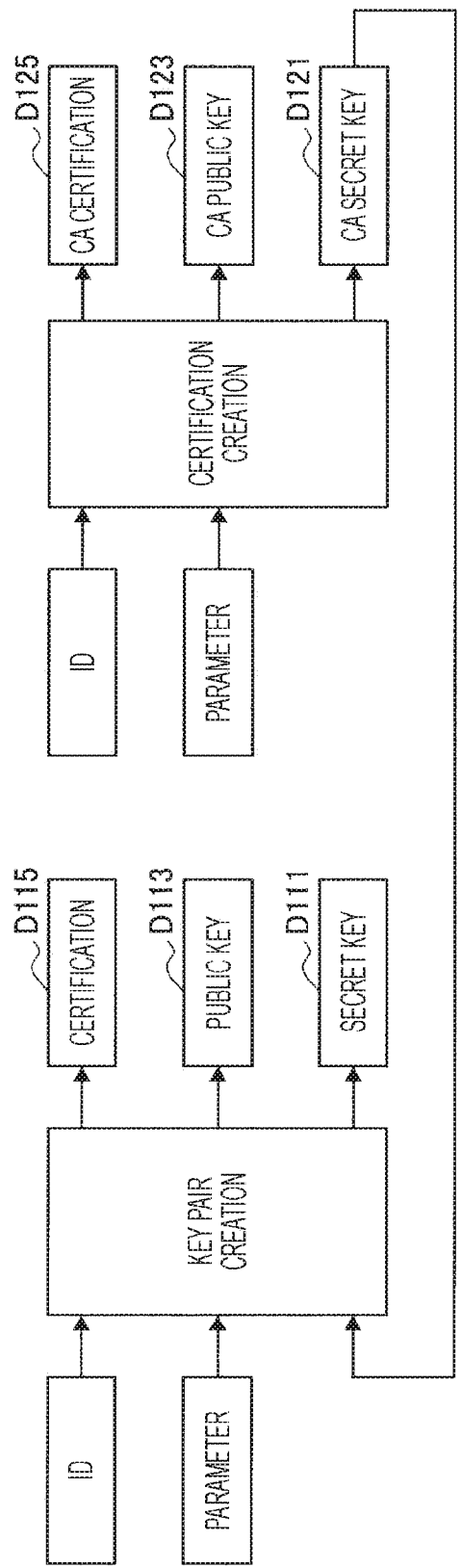
FIG. 5 is an explanatory diagram for explaining an overview of processing related to generation of key information based on the public key cryptography technology.

As shown in FIG. 5, the generation of the secret key D111 and the public key D113 is performed, for example, through a procedure with a certificate authority (CA). Specifically, the secret key D111 and the public key D113 (in other words, the secret key D111 and the public key D113 shown in FIG. 4) are generated by generating the key pair. Furthermore, the generated public key D113 is distributed to other devices by a predetermined method. Furthermore, as described above, the certification D115 includes the public key D113 and information for certifying its owner, and is used to check the validity of the public key D113. Note that the certification D115 is given a signature based on a secret key generated by the certificate authority (hereinafter also referred to as "CA secret key D121") in order to prevent tampering. Furthermore, the other devices verify the validity of the signature of the certification D115 (in other words, the signature by the certificate authority) on the basis of a public key (hereinafter, referred to as "CA public key D123") paired with the CA secret key D121 generated by the certificate authority. Furthermore, the CA public key D123 is distributed to other devices by a certificate (hereinafter, also referred to as "CA certificate D125") generated by the certificate authority. Note that the CA public key D123 shown in FIG. 5 corresponds to the CA public key D123 shown in FIG. 4.

Furthermore, the parameter D131 shown in FIG. 4 schematically shows various parameters used for generating the electronic signature. For example, in a case where an elliptic curve DSA is used for the digital signature generation algorithm, the private elliptic curve "CURVE", the base point "G", and the order "n" of G correspond to an example of the parameter D131. Note that, as described above, the digital signature generation algorithm is not necessarily limited to the elliptic curve DSA. In other words, the parameter D131 may be set as appropriate according to the algorithm used.

Then, as shown in FIG. 4, the signature generation unit 150 transmits the generated electronic signature to other devices (for example, the terminal device 200). Furthermore, at this time, the signature generation unit 150 may associate the generated electronic signature with various types of information to be output (for example, image data, and the like), and output the information associated with the electronic signature to the other devices.

(Terminal Device 200)

Next, the configuration of the terminal device 200 will be described. The terminal device 200 corresponds to a device that uses image data based on the imaging result of the solid-state imaging device 10, for example. As a specific example, the terminal device 200, like a smartphone or the like, causes a predetermined output unit such as a display to display image data based on the imaging result by the solid-state imaging device 10 as display information (for example, an image such as a still image or a moving image).

As shown in FIG. 4, the terminal device 200 includes an image processing unit 210, hash operation units 220 and 240, a signature verification unit 230, a certification verification unit 250, and a display control unit 260. Furthermore, in a predetermined storage region of the terminal device 200, the public key D113 and the parameter D133 used for verification of the electronic signature and the CA public key D123 and the parameter D135 used for verification of the certification D115 are held in a readable manner.

The image processing unit 210 performs predetermined image processing on the image data output from the information processing unit 100, and outputs the image data after the image processing to the display control unit 260.

The hash operation unit 240 and the certification verification unit 250 are configured to verify the validity of the public key D113 that forms a pair with the secret key D111 described above.

Specifically, the hash operation unit 240 acquires the certification D115 from the information processing unit 100, and calculates a hash value on the basis of the data of the certification D115. The hash value is used to verify the validity of the certification D115. Then, the hash operation unit 240 outputs information indicating the calculated hash value to the certification verification unit 250.

The certification verification unit 250 acquires the hash value calculated on the basis of the data of the certification D115 from the hash operation unit 240, and verifies the validity of the data of the certification D115 on the basis of the hash value. Note that other hash values for verifying the validity of the data of the certification D115, which is a comparison target of the hash values acquired from the hash operation unit 240, may be acquired in advance as part of the parameter D135, for example.

Next, the certification verification unit 250 verifies the validity of the certification D115 by checking the signature given to the certification D115 on the basis of the CA public key D123 acquired in advance. When the verification of the validity of the certification D115 is completed, the certification verification unit 250 verifies the validity of the public key D113 on the basis of the certification D115.

Note that, in the above description, an example in which the public key D113 is acquired in advance and the validity of the public key D113 is verified on the basis of the certification D115 has been described. However, the method is not particularly limited as long as the terminal device 200 can acquire the correct public key D113. As a specific example, the certification D115 may be used for distribution of the public key D113. In this case, the certification D115 including the data of the public key D113 is distributed to the terminal device 200. Furthermore, the terminal device 200 verifies the validity of the certification D115 acquired on the basis of the CA public key D123, and in a case where the validity of the certification D115 is confirmed, the terminal device 200 is only required to acquire the public key D113 included in the certification D115. In other words, the validity of the public key D113 acquired in this way is guaranteed by the certification D115. Furthermore, in this case, the distribution method of the certification D115 including the data of the public key D113 is not particularly limited. For example, the certification D115 may be held in the terminal device 200 by installing a predetermined application in the terminal device 200. Furthermore, as another example, the certification D115 may be disclosed on a predetermined public site.

As described above, the validity of the public key D113 held in the terminal device 200 is verified. Note that the certification verification unit 250 may notify the display control unit 260 of the verification result of the validity of the certification D115.

The hash operation unit 220 calculates a hash value on the basis of pixel data of at least some of the image data output from the information processing unit 100. Note that the hash value is used to verify the validity of the data of the electronic signature that is output from the information processing unit 100 (signature generation unit 150). In other words, it is desirable that the hash value calculation method by the hash operation unit 220 is preferably substantially similar to that of the hash operation unit 140 described above. The hash operation unit 220 outputs information indicating the calculated hash value to the signature verification unit 230.

The signature verification unit 230 acquires an electronic signature from the information processing unit 100. Furthermore, the signature verification unit 230 acquires information indicating the hash value calculated by the hash operation unit 220 from the hash operation unit 220. The signature verification unit 230 verifies the validity of the electronic signature on the basis of the acquired hash value, the public key D113 and the parameter D133 held in a predetermined storage region. The parameter D133 schematically shows a parameter used for verifying the validity of the electronic signature, and corresponds to, for example, the parameter D131 described above. In other words, in a case where the elliptic curve DSA is used to generate the digital signature, the parameter D133 corresponds to a parameter for verifying the digital signature on the basis of the elliptic curve DSA.

With the configuration as described above, the signature verification unit 230 can confirm the output source of data output from the information processing unit 100 such as data associated with the electronic signature, in other words, image data by verifying the electronic signature. Therefore, the signature verification unit 230 can determine a device (for example, a solid-state imaging device) that is an output source of image data or the like. Furthermore, the signature verification unit 230 can also verify whether or not image data or the like has been tampered with. Then, the signature verification unit 230 notifies the display control unit 260 of the verification result of the electronic signature.

The display control unit 260 acquires image data after image processing from the image processing unit 210, and outputs display information based on the image data to a predetermined output unit (for example, corresponds to a display or the like, and is not shown in FIG. 4). Furthermore, at that time, the display control unit 260 may control the output of the display information on the basis of the verification result of the electronic signature notified from the signature verification unit 230. Furthermore, the display control unit 260 may control the output of the display information described above on the basis of the verification result of the certification D115 notified from the certification verification unit 250.

As a specific example, the display control unit 260 may recognize the output source of the image data on the basis of the notification from the signature verification unit 230, and control the output of display information based on the image data according to the recognition result of the output source. Therefore. The display control unit 260 can also perform predetermined processing (for example, an application) only for an image captured by the predetermined solid-state imaging device 10.

Note that the functional configuration of the system 1 described above is merely an example, and the functional configuration of the system 1 is not necessarily limited to the example illustrated in FIG. 4 as long as the operation of each configuration described above is achieved. As a specific example, the information processing unit 100 and the terminal device 200 may be provided in the same casing. As a more specific example, for the imaging unit such as a digital camera provided in the terminal device 200, the solid-state imaging device 10 according to the present embodiment (in other words, the pixel array unit 21 and the information processing unit 100 shown in FIG. 4) may be provided. Furthermore, as another example, at least a part of the configurations of the information processing unit 100 may be provided outside the information processing unit 100 (and thus the solid-state imaging device 10). Note that, of the configurations of the information processing unit 100, a device provided with a configuration corresponding to the seed generation unit 120 corresponds to an example of the "information processing device". Furthermore, in the information processing device, a configuration for acquiring an image signal (in other words, pixel data of a target pixel) used for generating a seed value from the solid-state imaging device 10 corresponds to an example of the "acquisition unit".

Furthermore, in a case where the solid-state imaging device 10 is configured as a stacked solid-state imaging device, it is preferable that the information processing unit 100 described above be arranged on a die located below the die on which the pixel array unit 21 is arranged. As a specific example, the information processing unit 100 may be arranged in the logic circuit 345 in the diagram shown in the middle part of FIG. 3 or the logic circuit 355 in the diagram shown in the lower part of FIG. 3. Note that the information processing unit 100 (particularly, the seed generation unit 120) corresponds to an example of the "processing unit".

An example of a schematic configuration of a system to which the solid-state imaging device according to the present embodiment is applied is described above by focusing particularly on a part related to generation of an electronic signature and verification of the electronic signature, with reference to FIGS. 4 and 5.

<3.2 Details of Configuration Related to Seed Value Generation>

Next, in the system according to the present embodiment, the details of the configuration related to seed value generation will be described. For example, FIG. 6 is an explanatory diagram for describing an example of a configuration related to generation of a seed value, and shows an example of a functional configuration of the seed generation unit 120 shown in FIG. 5.

Figure 6:
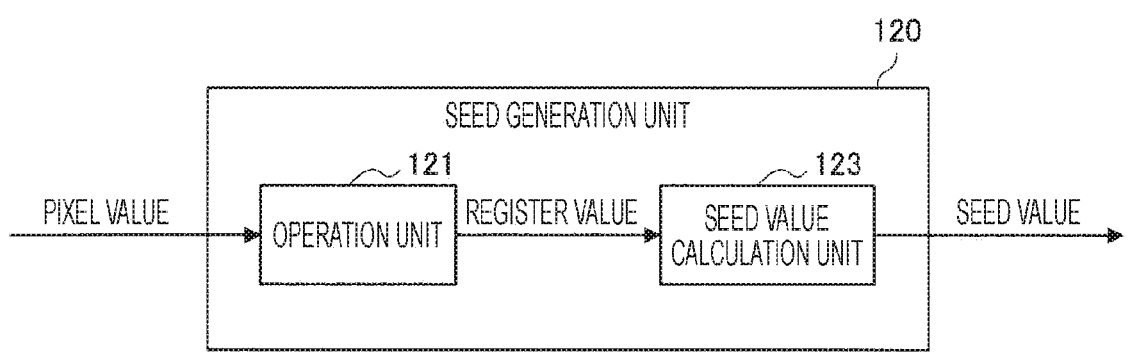
FIG. 6 is an explanatory diagram for explaining an example of a configuration related to generation of a seed value.

As shown in FIG. 6, the seed generation unit 120 includes an operation unit 121 and a seed value calculation unit 123.

The operation unit 121 acquires pixel data corresponding to each of the target pixel by setting at least some of the plurality of pixels included in the pixel array unit 21 (predetermined one or more pixels) as the target pixels. The operation unit 121 calculates, for every target pixel, a register value corresponding to the target pixel by inputting the pixel value indicated by the pixel data of the target pixel as input data to a predetermined register.

Figure 7:
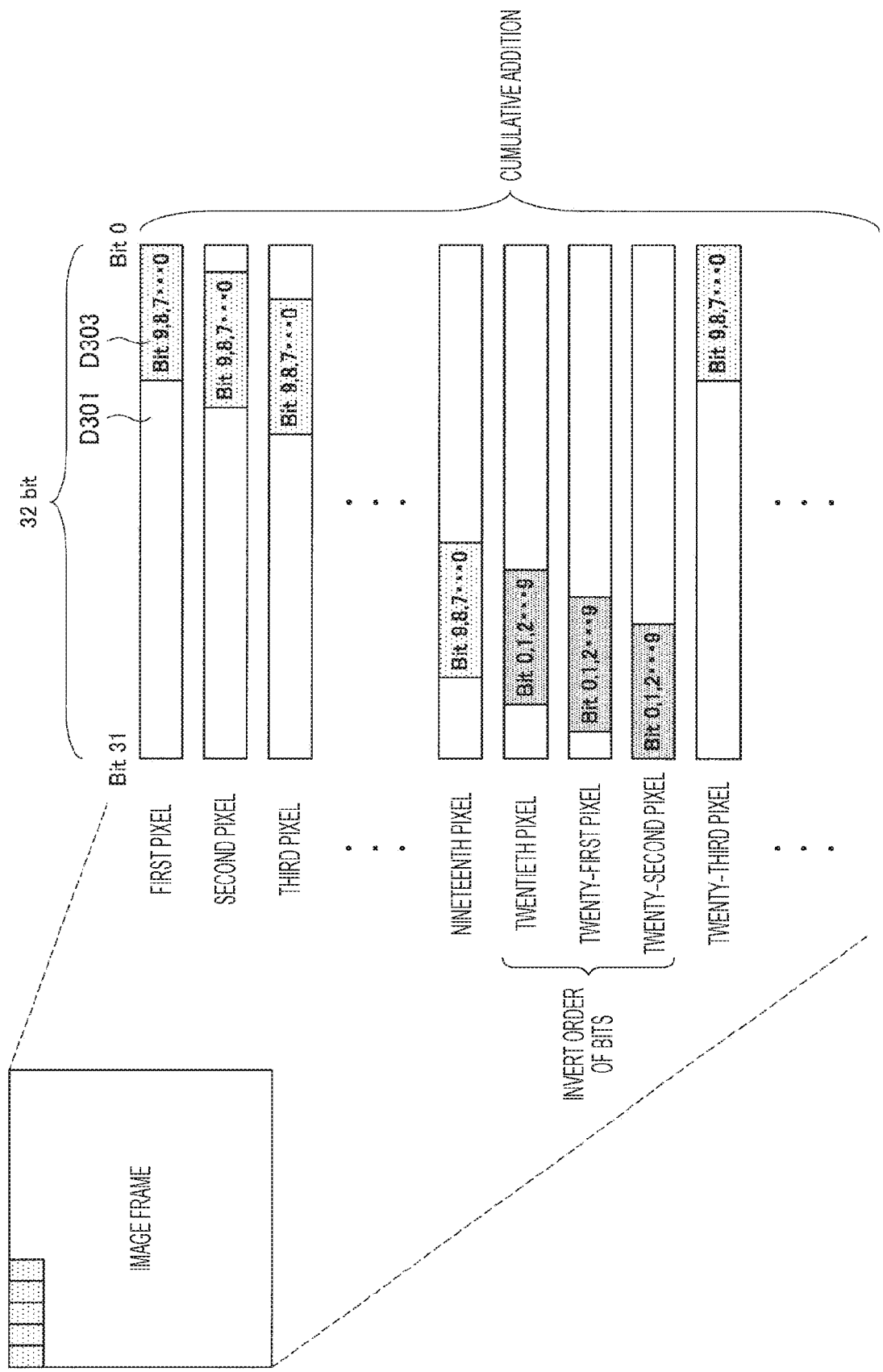
FIG. 7 is an explanatory diagram for explaining an overview of processing related to generation of a seed value.

For example, FIG. 7 is an explanatory diagram for explaining an overview of processing related to generation of a seed value. In FIG. 7, reference numeral D301 schematically indicates a register. Furthermore, reference numeral D303 indicates the input data corresponding to the pixel value of the target pixel input to the register D301 as a bit string. As shown in FIG. 7, when input data D303 corresponding to the pixel value of each target pixel is input to the register D301, a register value corresponding to the target pixel is calculated. Therefore, the register D301 has a bit length corresponding to the number of bits larger than the number of bits corresponding to the bit depth of the pixel value of the target pixel (in other words, the number of bits corresponding to the bit length of the input data). For example, in the example shown in FIG. 7, an example of a case where the bit depth of the pixel value is 10 bits and the bit length of the register D301 is 32 bits. Note that the number of bits corresponding to the depth of bit of the pixel value corresponds to an example of "first bit number", and the number of bits corresponding to the bit length of the register D301 corresponds to an example of "second bit number".

More specifically, for each of one or more target pixels, the operation unit 121 inputs the pixel value of the target pixel as input data D303 to the register D301. Furthermore, the operation unit 121 may shift the input data D303 input to the register D301 by the bit depth corresponding to the pixel position of the target pixel corresponding to the input data D303 in the register D301. As described above, the operation unit 121 calculates a register value for each of one or more target pixels. Note that, of the calculated register value, the other bits other than the input data D303 indicate a predetermined bit value (for example, 0) set as the initial value. Furthermore, the number of bits for shifting the input data D303, in other words, the number of bits corresponding to the pixel position described above corresponds to an example of the "third bit number".

Furthermore, the operation unit 121 may reverse the order (arrangement) of each bit of the input data D303 in a case where at least some bits of the input data D303 after the shift described above are included in a predetermined range in the register D301 (in other words, the endianness of the bit string may be inverted). For example, in the example shown in FIG. 7, in a case where the operation unit 121 inverts the order of each bit of the input data D303 in a case where at least some of the bits of the input data D303 after the shift described above are included within a predetermined range on the most significant bit (MSB) side in the register D301.

Furthermore, the operation unit 121 may cyclically shift the input data D303 in the register D301. In other words, as a result of the shift described above, in a case where the position of at least some of the bits in the input data D303 exceeds the MSB of the register D301, the operation unit 121 may shift the input data D303 again with the LSB of the register D301 as a base point.

As described above, the operation unit 121 calculates a register value for each of one or more target pixels on the basis of the pixel value of the target pixel, and outputs the register value calculated for every target pixel to the seed value calculation unit 123.

The seed value calculation unit 123 acquires a register value calculated for each of one or more target pixels from the operation unit 121, and calculates a seed value on the basis of the acquired register value for every target pixel. As a specific example, the seed value calculation unit 123 may calculate the seed value by cumulatively adding register values for every target pixel. Note that the seed value calculation method is not particularly limited as long as the seed value is calculated on the basis of the register value for every target pixel. Then, the seed value calculation unit 123 outputs the calculated seed value to a predetermined output destination (for example, the random number generation unit 130 shown in FIG. 4).

As described above, the seed generation unit 120 inputs the input data D303 corresponding to the pixel value of each target pixel to the register D301, and shifts the input data D303 in the register D301 according to the pixel position of the target pixel to calculate the register value. Then, the seed generation unit 120 calculates a seed value on the basis of the register value calculated for every target pixel. With such a configuration, the uniformity of data variation is improved in the bit length range of the seed value (in other words, the bit length range of the register D301).

Furthermore, the pixel value of each pixel tends to change more in the MSB side bits than in the LSB side bits. Furthermore, the pixel value has a tendency that noise influence concentrates more on the LSB side rather than on the MSB side. In view of such a situation, as described above, in a case where the shifted input data D303 is located on the MSB side of the register D301, it is possible to further improve the uniformity of data variation in the range of the bit length of the seed value by inverting the order of each bit of the input data D303. As described above, according to the seed generation unit 120 according to the present embodiment, it is possible to generate higher-quality random numbers (in other words, random numbers with higher randomness). In other words, by generating an electronic signature on the basis of the random number, it is possible to further improve the robustness of the electronic signature.

In the system according to the present embodiment, the details of the configuration related to seed value generation is described above with reference to FIGS. 6 and 7.

<3.3. Processing>

Subsequently, an example of a flow of a series of processing of the solid-state imaging device according to the present embodiment will be described by focusing particularly on processing related to generation of an electronic signature by the information processing unit 100 shown in FIG. 4. For example, FIG. 8 is a flowchart showing an example of a flow of a series of processing of the solid-state imaging device according to the present embodiment, and shows an example of a flow of processing related to generation of the electronic signature.

Figure 8:
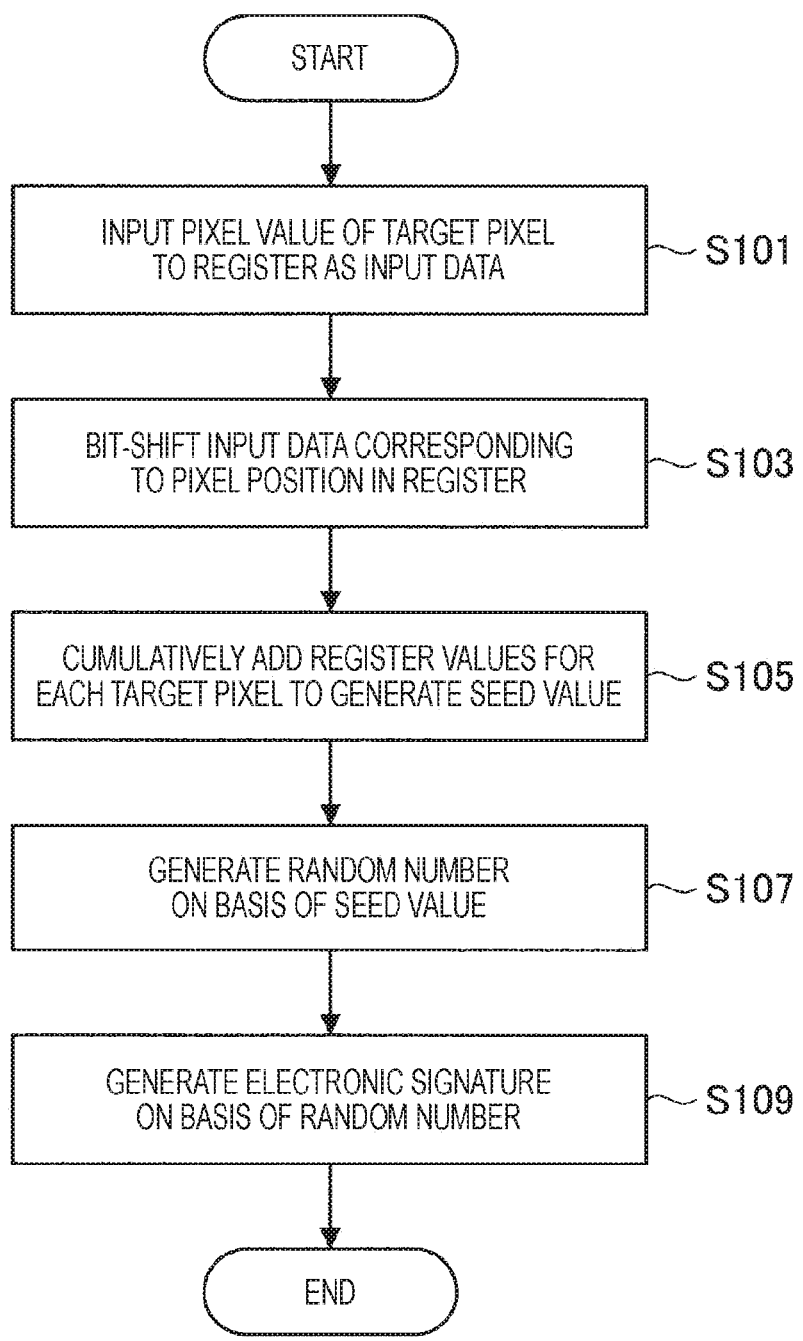
FIG. 8 is a flowchart showing an example of a flow of a series of processing of the solid-state imaging device according to the embodiment.

As shown in FIG. 8, the information processing unit 100 (the seed generation unit 120) acquires pixel data of the target pixel by setting at least some of the plurality of pixels included in the pixel array (predetermined one or more pixels) as the target pixels. The information processing unit 100 inputs a pixel value corresponding to the pixel data of the target pixel as input data to a predetermined register for every target pixel (S101).

The information processing unit 100 (the seed generation unit 120) shifts the input data input to the register by the number of bits corresponding to the pixel position of the target pixel corresponding to the input data in the register.

As described above, the information processing unit 100 (seed generation unit 120) calculates a register value for every target pixel, and generates a seed value by cumulatively adding the register values for each target pixel (S105).

Next, the information processing unit 100 (random number generation unit 130) generates a random number on the basis of the generated seed value (S107). Furthermore, the information processing unit 100 (signature generation unit 150) generates an electronic signature on the basis of the generated random number (S109). Note that the electronic signature generated as described above is used for, for example, identification of a device that is an output source of data output from the information processing unit 100 (in other words, the solid-state imaging device 10), and verification of whether or not the data has been tampered with.

An example of a flow of a series of processing of the solid-state imaging device according to the present embodiment is described above with reference to FIG. 8 by focusing particularly on processing related to generation of an electronic signature by the information processing unit 100 shown in FIG. 4.

4. APPLICATION EXAMPLE

The technology (the present technology) according to the present disclosure can be applied to various products. Therefore, hereinafter, application examples of the present technology will be described, in particular, an example in a case of application to each of an endoscopic surgery system and a moving body.

<4.1 Application Example to Endoscopic Surgery System>

First, an example of a case where the technology according to the present disclosure is applied to an endoscopic surgery system will be described.

Figure 9:
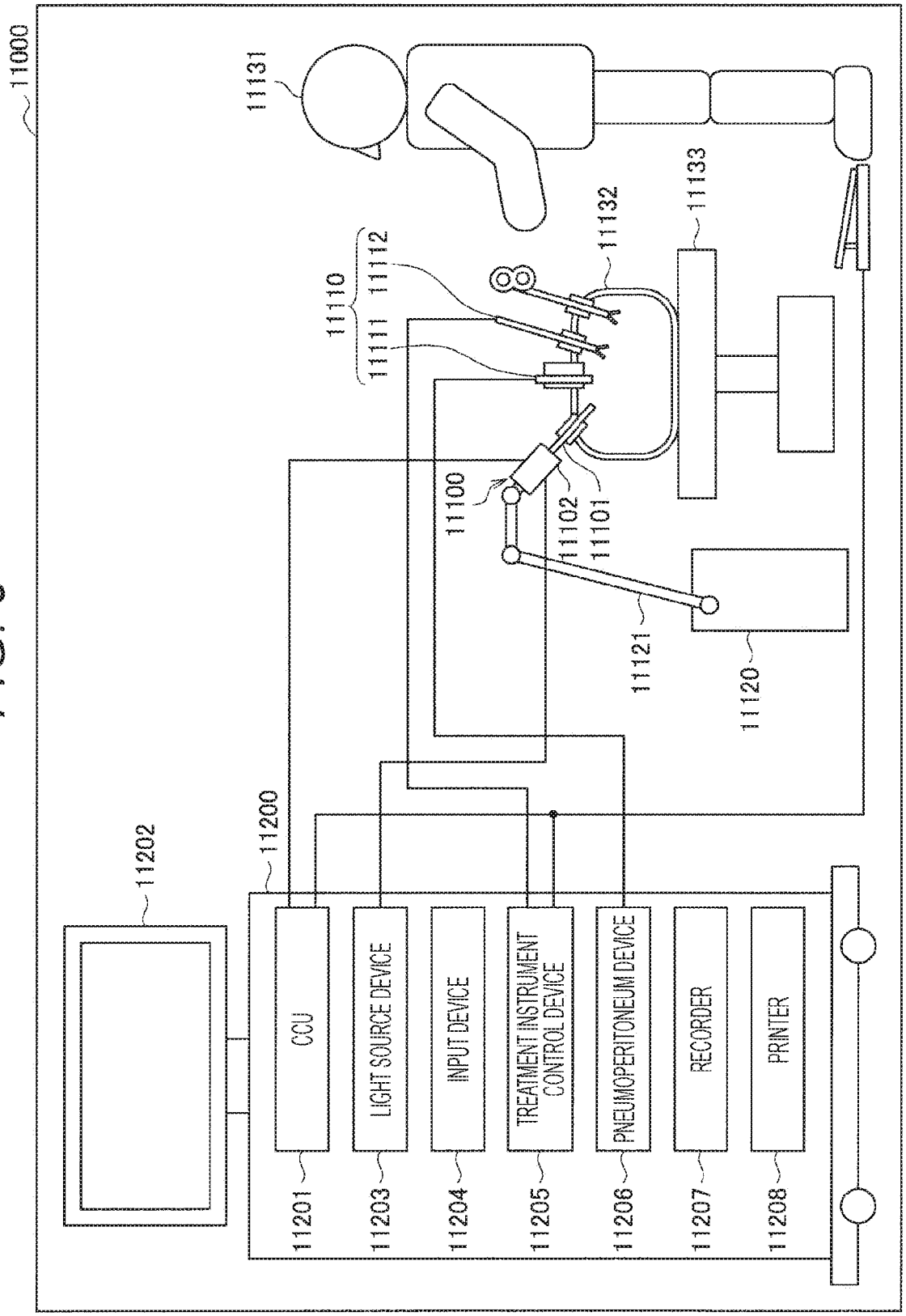
FIG. 9 is a diagram showing an example of a schematic configuration of an endoscopic surgery system.

FIG. 9 is a diagram showing an example of a schematic configuration of an endoscopic surgery system to which the technology (the present technology) according to the present disclosure can be applied.

FIG. 9 shows a situation where a surgeon (physician) 11131 performs surgery on a patient 11132 on a patient bed 11133 using an endoscopic surgery system 11000. As shown in the drawing, the endoscopic surgery system 11000 includes an endoscope 11100, other surgical tools 11110 such as a pneumoperitoneum tube 11111 and an energy treatment instrument 11112, a support arm device 11120 that supports the endoscope 11100, and a cart 11200 on which various devices for endoscopic surgery are mounted.

The endoscope 11100 includes a lens barrel 11101 in which a region of a predetermined length from the distal end is inserted into the body cavity of the patient 11132, and a camera head 11102 connected to the proximal end of the lens barrel 11101. In the illustrated example, the endoscope 11100 formed as a so-called rigid mirror having a rigid lens barrel 11101 is illustrated. However, the endoscope 11100 may be formed as a so-called flexible mirror having a flexible lens barrel.

At the tip of the lens barrel 11101, an opening portion into which an objective lens is fitted is provided. A light source device 11203 is connected to the endoscope 11100 and light generated by the light source device 11203 is guided to the distal end of the lens barrel by a light guide extending inside the lens barrel 11101, and is emitted toward the observation target in the body cavity of the patient 11132 via the objective lens. Note that the endoscope 11100 may be a direct view mirror, a perspective mirror or a side view mirror.

An optical system and an imaging element are provided inside the camera head 11102, and reflected light (observation light) from the observation target is collected to the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 11201.

The CCU 11201 includes a central processing unit (CPU) or graphics processing unit (GPU), or the like, and centrally controls operation of the endoscope 11100 and the display device 11202. Moreover, the CCU 11201 receives an image signal from the camera head 11102, and performs various image processing for display of the image based on the image signal, such as, development processing (demosaic processing), for example, for the image signal.

The display device 11202 displays the image based on the image signal subjected to image processing by the CCU 11201 under the control of the CCU 11201.

The light source device 11203 includes a light source such as a light emitting diode (LED), for example, and supplies irradiation light to the endoscope 11100 in photographing a surgical site or the like.

The input device 11204 is an input interface to the endoscopic surgery system 11000. The user can input various information and input instructions to the endoscopic surgery system 11000 via the input device 11204. For example, the user inputs an instruction or the like to change imaging conditions by the endoscope 11100 (kind of irradiation light, magnification, focal length, or the like).

The treatment instrument control device 11205 controls driving of the energy treatment instrument 11112 for cauterizing tissue, cutting incisions, sealing blood vessels, or the like. The pneumoperitoneum device 11206 feeds gas into the body cavity of the patient 11132 via the pneumoperitoneum tube 11111 to inflate the body cavity for the purpose of securing a visual field by the endoscope 11100 and securing a working space of the surgeon. The recorder 11207 is a device capable of recording various kinds of information associated with surgery. The printer 11208 is a device capable of printing various kinds of information associated with surgery in various formats such as text, image, and graph.

Note that the light source device 11203 that supplies irradiation light in photographing of a surgical site to the endoscope 11100 can include, for example, a white light source including an LED, a laser light source, or a combination thereof. In a case where the white light source is configured by the combination of the RGB laser light sources, since the output intensity and the output timing of each color (each wavelength) can be controlled with high accuracy, adjustment of the white balance of the captured image by the light source device 11203 can be performed. Furthermore, in this case, the laser light from each of the RGB laser light sources is emitted to the observation target in time division and driving of the imaging element of the camera head 11102 is controlled in synchronization with the emission timing, so that it is possible to image images corresponding to each of RGB in time division. According to this method, a color image can be obtained without providing a color filter in the imaging element.

Furthermore, the light source device 11203 may be controlled to change the intensity of light to be output at predetermined time intervals. The driving of the imaging element of the camera head 11102 is controlled in synchronization with the timing of the change of the intensity of the light, images are obtained in time division, and the images are combined, so that it is possible to generate a high dynamic image in which so-called halation and black defects do not exist.

Furthermore, the light source device 11203 may be configured so as to be capable of supplying light of a predetermined wavelength band corresponding to special light observation. In the special light observation, for example, the wavelength dependence of light absorption in the body tissue is utilized, and narrow band light compared with irradiation light at the time of ordinary observation (in other words, white light) is emitted, so that photographing a predetermined tissue such as a blood vessel in the mucosal surface layer with high contrast, which is so-called narrow band imaging, is performed. Alternatively, in the special light observation, fluorescence observation for obtaining an image by fluorescence generated by emitting excitation light may be performed. In the fluorescence observation, it is possible to irradiate a body tissue with excitation light to observe the fluorescence from the body tissue (autofluorescence observation), to inject a reagent such as indocyanine green (ICG) to the body tissue and irradiate the body tissue with excitation light corresponding to the fluorescence wavelength of the reagent to obtain a fluorescent image, or the like. The light source device 11203 can be configured so as to be able to supply narrowband light and/or excitation light corresponding to such special light observation.

Figure 10:
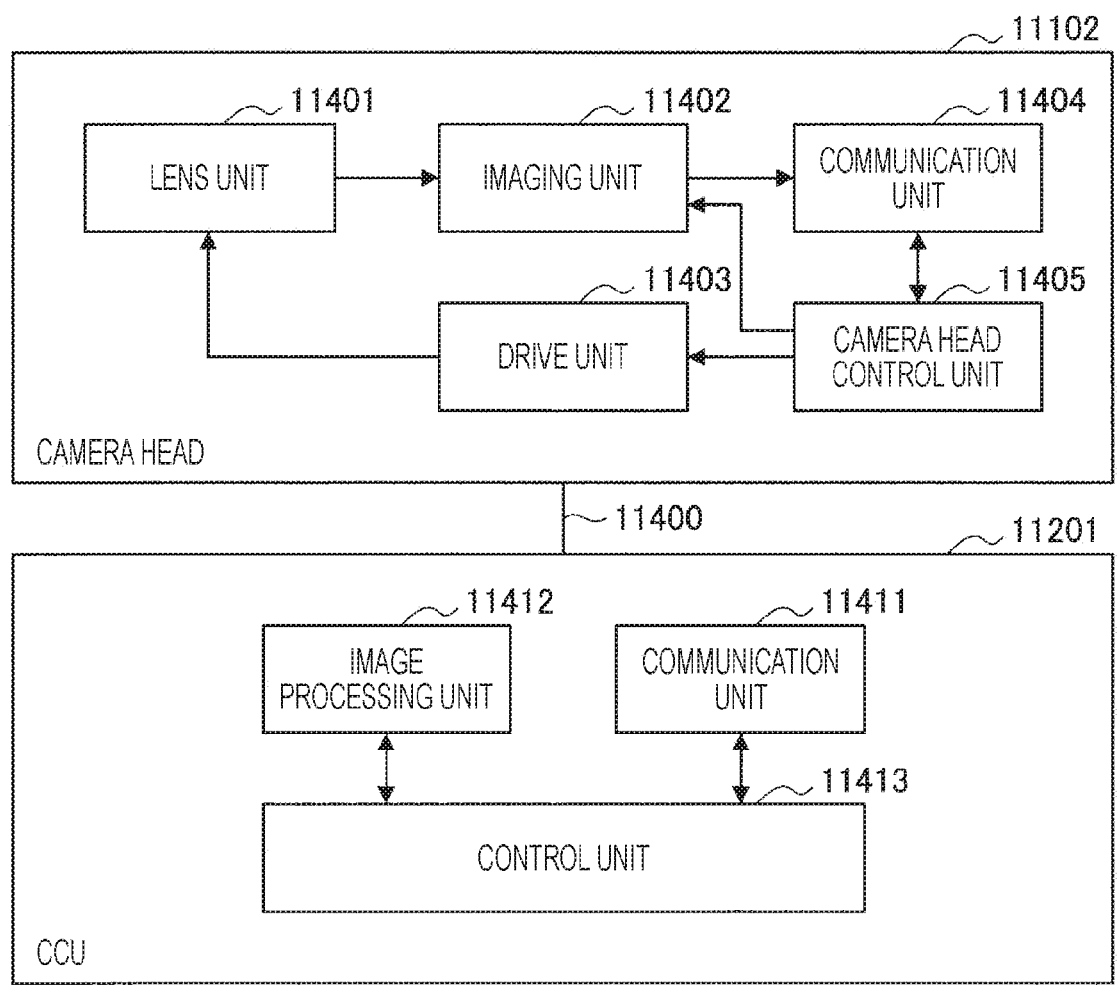
FIG. 10 is a block diagram showing an example of a functional configuration of a camera head and a CCU.

FIG. 10 is a block diagram showing an example of a functional configuration of the camera head 11102 and the CCU 11201 shown in FIG. 9.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connecting portion with the lens barrel 11101. The observation light taken in from the distal end of the lens barrel 11101 is guided to the camera head 11102 and is incident on the lens unit 11401. The lens unit 11401 is configured by combining a plurality of lenses including a zoom lens and a focus lens.

The imaging unit 11402 includes an imaging element. The imaging element included in the imaging unit 11402 may be one (so-called single plate type) or plural (so-called multiple plate type). In a case where the imaging unit 11402 is formed in a multiple plate type, for example, image signals corresponding to each of R, G, and B may be generated by each imaging element, and the signals may be combined so that a color image is obtained. Alternatively, the imaging unit 11402 may have a pair of imaging elements for acquiring right-eye and left-eye image signals corresponding to 3 dimensional (3D) display, respectively. By the 3D display, the surgeon 11131 can grasp the depth of a living tissue in the surgical site more accurately. Note that, in a case where the imaging unit 11402 is formed in a multiple plate type, a plurality of lens units 11401 can be provided corresponding to each imaging element.

Furthermore, the imaging unit 11402 is not necessarily provided in the camera head 11102. For example, the imaging unit 11402 may be provided inside the lens barrel 11101 immediately after the objective lens.

The drive unit 11403 includes an actuator and moves the zoom lens and the focus lens of the lens unit 11401 by a predetermined distance along the optical axis under the control of the camera head control unit 11405. As a result, the magnification and the focus of the captured image by the imaging unit 11402 can be appropriately adjusted.

The communication unit 11404 includes a communication device for transmitting and receiving various kinds of information to and from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling driving of the camera head 11102 from the CCU 11201, and supplies the control signal to the camera head control unit 11405. The control signal may include, for example, information associated with imaging conditions such as information that a frame rate of the imaging image is designated, information that an exposure value at the time of imaging is designated, and/or information that the magnification and focus of the captured image is designated.

Note that the imaging conditions such as the frame rate, the exposure value, the magnification, and the focus may be appropriately specified by a user, or may be automatically set by the control unit 11413 of the CCU 11201 on the basis of the acquired image signal. In the latter case, a so-called auto exposure (AE) function, auto focus (AF) function, the auto white balance (AWB) function are installed in the endoscope 11100.

The camera head control unit 11405 controls driving of the camera head 11102 on the basis of the control signal from the CCU 11201 received via the communication unit 11404.

The communication unit 11411 includes a communication device for transmitting and receiving various kinds of information to and from the camera head 11102. The communication unit 11411 receives an image signal transmitted from the camera head 11102 via the transmission cable 11400.

Furthermore, the communication unit 11411 transmits a control signal for controlling driving of the camera head 11102 to the camera head 11102. The image signal and the control signal can be transmitted by electric communication, optical communication, or the like.

The image processing unit 11412 performs various image processing on the image signal which is RAW data transmitted from the camera head 11102.

The control unit 11413 performs various control relating to imaging of a surgical site or the like by the endoscope 11100, and display of captured images obtained by imaging of a surgical site or the like. For example, the control unit 11413 generates a control signal for controlling driving of the camera head 11102.

Furthermore, the control unit 11413 causes the display device 11202 to display the captured image including a surgical site or the like on the basis of the image signal subjected to the image processing by the image processing unit 11412. At this time, the control unit 11413 may recognize various objects in the captured image using various image recognition techniques. For example, the control unit 11413 can recognize a surgical tool such as a forceps, a specific body part, bleeding, a mist at the time of using the energy treatment instrument 11112, or the like by detecting the shape, color, or the like of the edge of the object included in the captured image. When causing the display device 11202 to display the captured image, the control unit 11413 may cause various surgical operation support information to be superimposed and displayed on the image of the surgical site using the recognition result. The surgical operation support information is superimposed and displayed, and presented to the surgeon 11131, so that the burden on the surgeon 11131 can be reduced and the surgeon 11131 can reliably proceed with surgery.

The transmission cable 11400 connecting the camera head 11102 and the CCU 11201 is an electric signal cable corresponding to communication of electric signals, an optical fiber corresponding to optical communication, or a composite cable thereof.

Here, in the example shown in the drawing, communication is performed by wire using the transmission cable 11400. However, communication between the camera head 11102 and the CCU 11201 may be performed wirelessly.

An example of the endoscopic surgery system to which the technology according to the present disclosure can be applied has been described above. The technology according to the present disclosure can be applied to the imaging unit 11402 of the camera head 11102 in the above-described configuration. Specifically, by applying the solid-state imaging device 10 described with reference to FIGS. 1 to 3 to the imaging unit 11402 of the camera head 11102, it is possible to generate in the inside of the imaging unit 11402 an electronic signature certifying that the output source of the image captured by the imaging unit 11402 is the imaging unit 11402. In other words, the other device using the image can verify whether or not the output source of the image is the imaging unit 11402 on the basis of the electronic signature. Therefore, for example, it is possible to achieve control such that an application target of processing (application) performed by the other device is limited to only an image captured by the imaging unit 11402.

Note that, although an endoscopic surgery system has been described as an example here, the technology according to the present disclosure may also be applied to, for example, a microscopic surgery system or the like.

<4.2 Application Example to Mobile Body>

Subsequently, an example of a case where the technology according to the present disclosure is applied as a device mounted on any type of mobile body such as a car, electric vehicle, hybrid electric vehicle, motorcycle, bicycle, personal mobility, airplane, drone, ship, or robot.

Figure 11:
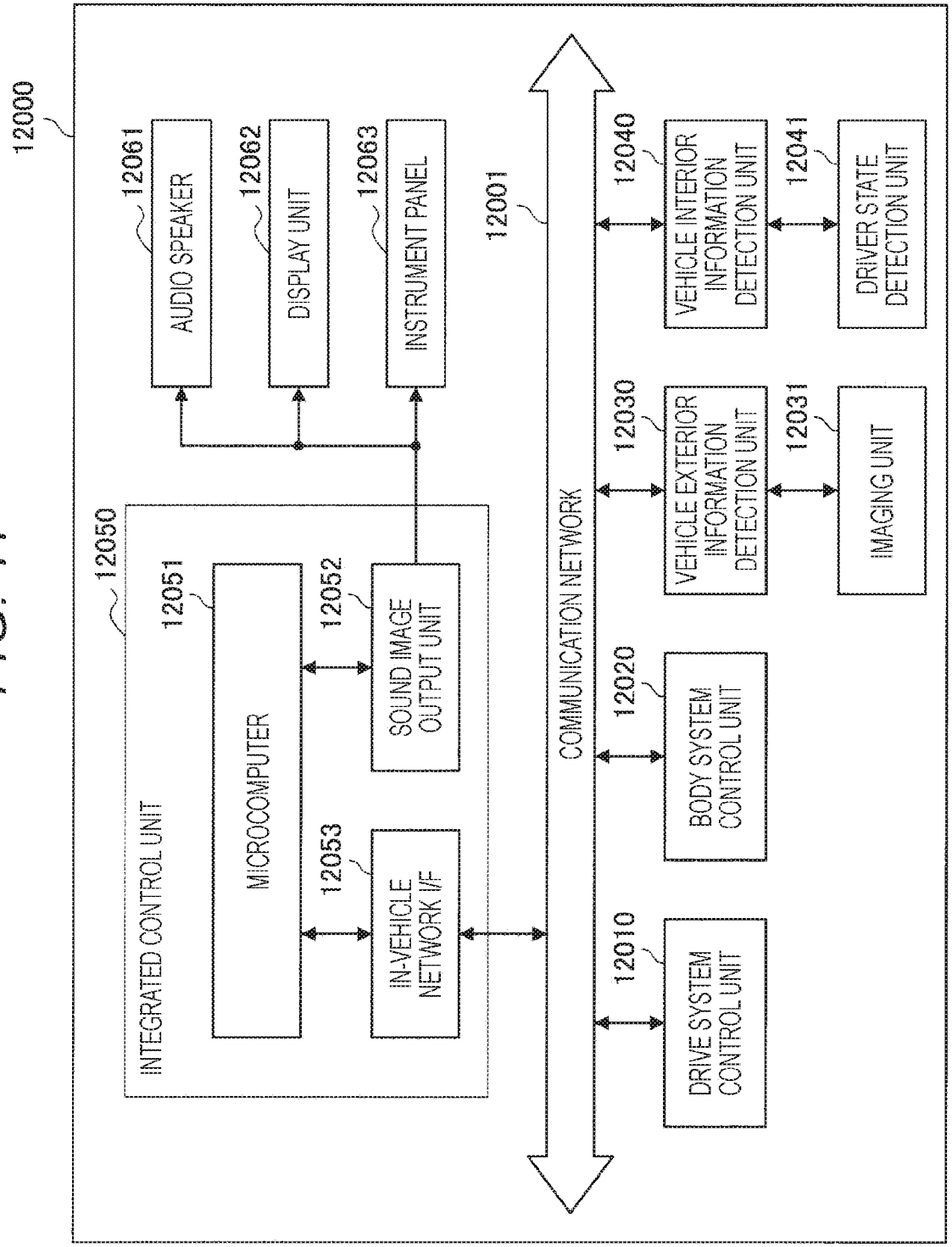
FIG. 11 is a block diagram showing a schematic configuration example of a vehicle control system.

FIG. 11 is a block diagram showing a schematic configuration example of a vehicle control system which is an example of a mobile body control system to which the technology according to the present disclosure can be applied.

The vehicle control system 12000 includes a plurality of electronic control units connected via a communication network 12001. In the example shown in FIG. 11, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, a sound image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device for a driving force generating device for generating a driving force of a vehicle such as an internal combustion engine or a driving motor, a driving force transmitting mechanism for transmitting a driving force to the wheels, a steering mechanism that adjusts steering of a vehicle, a braking device that generates a braking force of a vehicle, or the like.

The body system control unit 12020 controls the operation of various devices equipped in a vehicle body according to various programs. For example, the body system control unit 12020 functions as a control device for a keyless entry system, a smart key system, a power window device, or various lamps such as a head lamp, a back lamp, a brake lamp, a turn indicator, or a fog lamp. In this case, a radio wave transmitted from a portable device that substitutes for a key or a signal of various switches may be input to the body system control unit 12020. The body system control unit 12020 receives the input of these radio waves or signals and controls a door lock device, a power window device, a lamp, or the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform object detection processing or distance detection processing such as a person, a car, an obstacle, a sign, or a character on a road surface, on the basis of the received image.

The imaging unit 12031 is an optical sensor that receives light and outputs an electric signal corresponding to the amount of light received. The imaging unit 12031 can output an electric signal as an image or output the electric signal as distance measurement information. Furthermore, the light received by the imaging unit 12031 may be visible light or invisible light such as infrared light.

The vehicle interior information detection unit 12040 detects information inside the vehicle. For example, a driver state detection unit 12041 that detects the state of the driver is connected to the vehicle interior information detection unit 12040. The driver state detection unit 12041 includes, for example, a camera that images the driver, and the vehicle interior information detection unit 12040 may calculate the degree of fatigue or degree of concentration of the driver on the basis of the detection information input from the driver state detection unit 12041, or may determine whether or not the driver is dozing off.

The microcomputer 12051 can calculate a control target value of the driving force generating device, the steering mechanism or the braking device on the basis of the information inside and outside of the vehicle acquired by the vehicle exterior information detection unit 12030 or the vehicle interior information detection unit 12040, and can output a control command to the drive system control unit 12010. For example, the microcomputer 12051 can perform cooperative control for the purpose of realization of the function of advanced driver assistance system (ADAS) including collision avoidance or impact mitigation of the vehicle, follow-up running based on the distance between vehicles, vehicle speed maintenance running, vehicle collision warning, vehicle lane departure warning, or the like.

Furthermore, the microcomputer 12051 controls the driving force generating device, the steering mechanism, the braking device, or the like on the basis of the information regarding the surroundings of the vehicle acquired by the vehicle exterior information detection unit 12030 or the vehicle interior information detection unit 12040, so that the microcomputer 12051 can perform cooperative control for the purpose of, for example, automatic driving in which a vehicle autonomously runs without depending on the operation of the driver.

Furthermore, the microcomputer 12051 can output a control command to the body system control unit 12020 on the basis of the vehicle exterior information acquired by the vehicle exterior information detection unit 12030. For example, the microcomputer 12051 can control the headlamp according to the position of the preceding vehicle or the oncoming vehicle detected by the vehicle exterior information detection unit 12030, and perform cooperative control for the purpose of antiglare such as switching the high beam to low beam.

The sound image output unit 12052 transmits at least one of sound or image output signals to an output device capable of visually or audibly notifying the occupant of the vehicle or the outside of the vehicle, of information. In the example of FIG. 11, as an output device, an audio speaker 12061, a display unit 12062, and an instrument panel 12063 are illustrated. The display unit 12062 may include at least one of an on-board display or a head-up display, for example.

Figure 12:
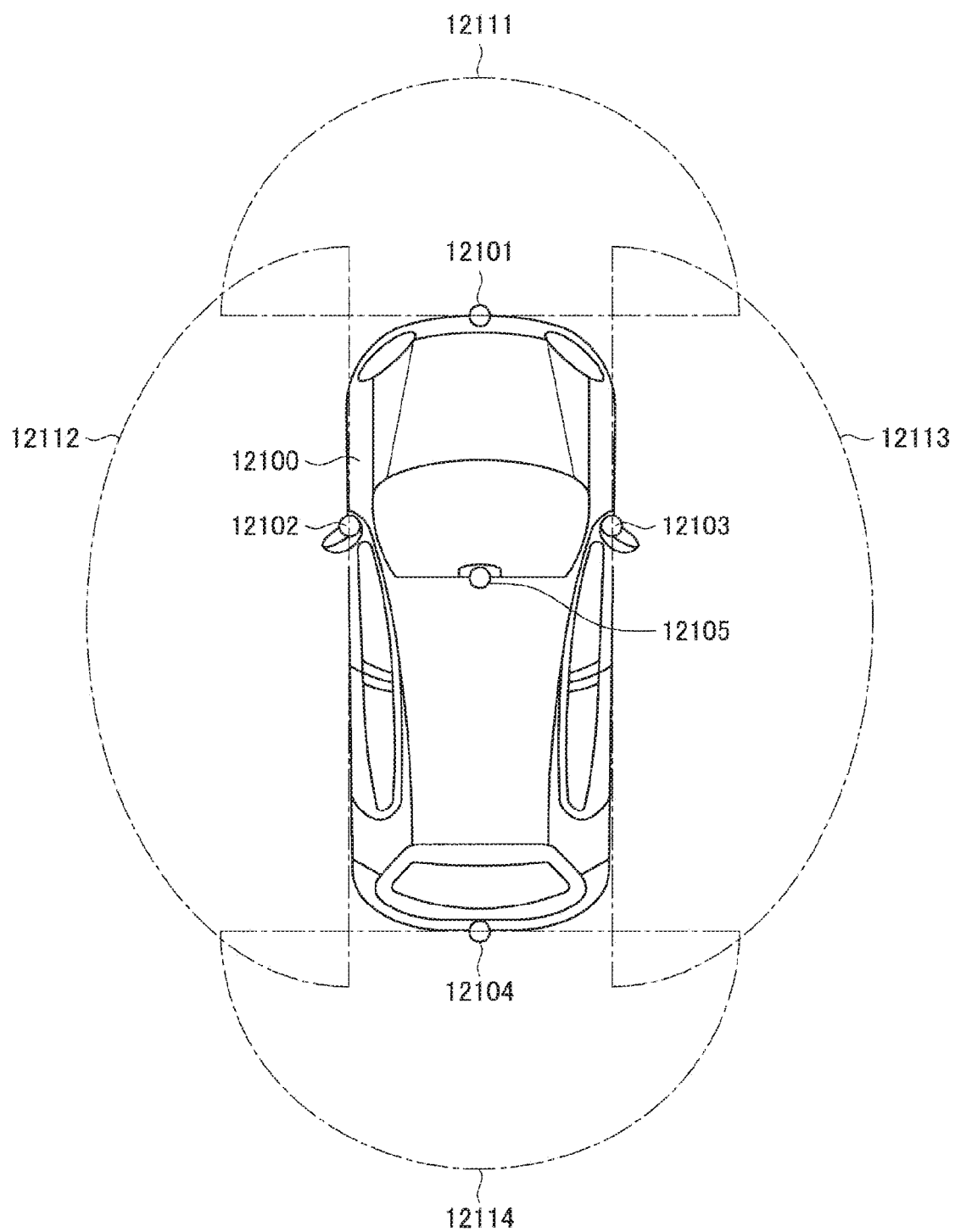
FIG. 12 is an explanatory diagram showing examples of installation positions of a vehicle exterior information detection part and an imaging part.

FIG. 12 is a diagram showing an example of an installation position of the imaging unit 12031.

In FIG. 12, as the imaging unit 12031, the vehicle 12100 includes imaging units 12101, 12102, 12103, 12104, and 12105.

For example, the imaging units 12101, 12102, 12103, 12104, and 12105 are provided at positions such as the front nose, the side mirror, the rear bumper, the back door, and the upper portion of the windshield in the vehicle compartment of the vehicle 12100. The imaging unit 12101 provided in the front nose and the imaging unit 12105 provided in the upper portion of the windshield in the vehicle compartment mainly acquire an image of the forward of the vehicle 12100. The imaging units 12102 and 12103 provided in the side mirrors mainly acquire images of the sides of the vehicle 12100. The imaging unit 12104 provided in the rear bumper or the back door mainly acquires images of the rearward of the vehicle 12100. An image in the front acquired by the imaging units 12101 and 12105 is mainly used for detecting a preceding vehicle, a pedestrian, an obstacle, a traffic signal, a traffic sign, a lane, or the like.

Note that FIG. 12 shows examples of the imaging ranges of the imaging units 12101 to 12104. An imaging range 12111 indicates an imaging range of the imaging unit 12101 provided in the front nose, the imaging ranges 12112 and 12113 indicate the imaging range of the imaging units 12102 and 12103 provided in the side mirror, respectively, and the imaging range 12114 indicates the imaging range of the imaging unit 12104 provided in the rear bumper or the back door. For example, by overlapping the image data imaged by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having a pixel for phase difference detection.

For example, the microcomputer 12051 obtains the distance to each three-dimensional object within the imaging range 12111 to 12114 and the temporal change of the distance (relative speed with respect to the vehicle 12100), on the basis of the distance information obtained from the imaging units 12101 to 12104, so that the microcomputer 12051 can extract particularly a three-dimensional object that is the closest on the traveling path of the vehicle 12100 and runs at a predetermined speed (for example, 0 km/h or more) in substantially the same direction as that of the vehicle 12100, as a preceding vehicle. Moreover, the microcomputer 12051 can set in advance an inter-vehicle distance to be secured in front of the preceding vehicle, and can perform automatic brake control (including follow-up stop control), automatic acceleration control (including follow-up start control), or the like. In this manner, it is possible to perform cooperative control for the purpose of automatic driving or the like that autonomously runs without depending on the operation of the driver.

For example, on the basis of the distance information obtained from the imaging units 12101 to 12104, the microcomputer 12051 can classify three-dimensional object data on the three-dimensional object into three-dimensional objects such as a two-wheeled vehicle, a regular vehicle, a large vehicle, a pedestrian, a telephone pole, and other three-dimensional objects, and extract the result to use the result for automatic avoidance of obstacles. For example, the microcomputer 12051 identifies an obstacle in the vicinity of the vehicle 12100 as an obstacle that the driver of the vehicle 12100 can see and an obstacle that is difficult to see. Then, the microcomputer 12051 determines the collision risk indicating the risk of collision with each obstacle, and when the collision risk is equal to or higher than a set value and there is a possibility of collision, the microcomputer 12051 can output an alarm to the driver via the audio speaker 12061 and the display unit 12062 or perform forced deceleration or avoiding steering via the drive system control unit 12010, so as to perform driving assistance for collision avoidance.

At least one of the imaging units 12101 to 12104 may be an infrared camera for detecting infrared rays. For example, the microcomputer 12051 can recognize a pedestrian by determining whether or not a pedestrian exists in the captured images of the imaging units 12101 to 12104. Such recognizing of a pedestrian is performed, for example, by a procedure of extracting feature points in the captured image of the imaging units 12101 to 12104 as an infrared camera and a procedure of performing pattern matching processing on a series of feature points indicating the outline of the object to discriminate whether or not it is a pedestrian. When the microcomputer 12051 determines that a pedestrian exists in the captured images of the imaging units 12101 to 12104 and recognizes the pedestrian, the sound image output unit 12052 controls the display unit 12062 to superimpose and display a rectangular contour line for emphasis on the recognized pedestrian. Furthermore, the sound image output unit 12052 may control the display unit 12062 to display icons or the like indicating pedestrians at desired positions.

An example of the vehicle control system to which the technology according to the present disclosure can be applied has been described above. The technology according to the present disclosure can be applied to the imaging unit 12101 in the above-described configuration. Specifically, by applying the solid-state imaging device 10 described with reference to FIGS. 1 to 3 to the imaging unit 12101, it is possible to generate in the inside of the imaging unit 12101 an electronic signature certifying that the output source of the image captured by the imaging unit 12101 is the imaging unit 12101. In other words, the other device using the image can verify whether or not the output source of the image is the imaging unit 12101 described above on the basis of the electronic signature. Therefore, for example, it is possible to achieve control such that an application target of processing (application) performed by the other device is limited to only an image captured by the imaging unit 12101.

5. CONCLUSION

As described above, the solid-state imaging device according to the present embodiment includes a pixel array unit in which a plurality of pixels is arrayed and a processing unit that generates a seed value of random number on the basis of a pixel value of each of predetermined one or more target pixels among the plurality of pixels. The pixel array unit described above is arranged on the first substrate. Furthermore, the processing unit described above is arranged on the second substrate. Furthermore, in the solid-state imaging device according to the present embodiment, the plurality of substrates including at least the first substrate and the second substrate is stacked so that the second substrate is located in a lower layer than the first substrate. In particular, random noise occurs in an image captured by the solid-state imaging device. Therefore, in the solid-state imaging device according to the present embodiment, random noise generated in the image is used for generating a seed value that can be used for generating a random number.

Furthermore, for each of the one or more target pixels, the processing unit may input the pixel value of the target pixel as input data to the register having the bit length by the second bit number larger than the first bit number corresponding to the depth of bit of the pixel value to calculate the register value. In this case, the processing unit generates the seed value described above on the basis of the register value calculated for each of the one or more target pixels described above. With the configuration as described above, it is possible to further improve the uniformity of data variation in the range of the bit length of the seed value. By generating a random number using the seed value generated as described above, it is possible to generate higher-quality random numbers (in other words, random numbers with higher randomness).

While preferred embodiments of the present disclosure have been described above in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

Furthermore, the effects described in the present specification are merely illustrative or exemplary, and are not limitative. That is, the technique according to the present disclosure can exhibit other effects obvious to those skilled in the art from the description of the present specification together with the effects described above or instead of the effects described above.

Note that the following configuration is also within the technical scope of the present disclosure.

(1)
A solid-state imaging device including:
a pixel array unit in which a plurality of pixels is arrayed; and
a processing unit that generates a seed value of a random number on the basis of each pixel value of predetermined one or more target pixels of the plurality of pixels,
in which the pixel array unit is arranged on a first substrate,
the processing unit is arranged on a second substrate, and
a plurality of substrates including at least the first substrate and the second substrate is stacked so that the second substrate is located in a lower layer than the first substrate.

(2)
The solid-state imaging device according to (1) described above,
in which the processing unit
inputs the pixel value of the target pixel as input data to a register having a bit length by a second bit number larger than a first bit number corresponding to a depth of bit of the pixel value to calculate a register value for each of the one or more target pixels, and
generates the seed value on the basis of the register value calculated for each of the one or more target pixels.

(3)
The solid-state imaging device according to (2) described above, in which the processing unit shifts, in the register, the input data input to the register by a third bit number corresponding to a pixel position of the target pixel corresponding to the input data to calculate the register value.

(4)
The solid-state imaging device according to (3) described above, in which the processing unit cyclically shifts, in the register, the input data input to the register to calculate the register value.

(5)
The solid-state imaging device according to (3) or (4) described above, in which the processing unit inverts an order of each bit of the input data to calculate the register value, in a case where at least some bits of the input data after the shift are included in a predetermined range in the register.

(6)
The solid-state imaging device according to any of (2) to (5) described above, in which the processing unit generates the seed value by adding the register value calculated for each of the one or more target pixels.

(7)
The solid-state imaging device according to any of (1) to (6), in which the processing unit generates a random number on the basis of the seed value generated.

(8)
The solid-state imaging device according to (7) described above, in which the processing unit generates an electronic signature on the basis of the random number generated.

(9)
An information processing device including:
an acquisition unit that acquires an image signal corresponding to each of predetermined one or more target pixels in a pixel region in which a plurality of pixels is arrayed; and
a processing unit that generates a seed value of a random number on the basis of each pixel value of the one or more target pixels corresponding to the image signal.

REFERENCE SIGNS LIST

1 System
10 Solid-state imaging device
21 Pixel array unit
100 Information processing unit
110 Crop processing unit
120 Seed generation unit
121 Operation unit
123 Seed value calculation unit
130 Random number generation unit
140 Hash operation unit
150 Signature generation unit
200 Terminal device
210 Image processing unit
220 Hash operation unit
230 Signature verification unit
240 Hash operation unit
250 Certification verification unit
260 Display control unit

The invention claimed is:
1. A solid-state imaging device, comprising:
a plurality of substrates that includes a first substrate and a second substrate, wherein the second substrate is below the first substrate;
a pixel array unit on the first substrate, wherein the pixel array unit includes a plurality of pixels; and
a processing unit on the second substrate, wherein the processing unit is configured to:
input, as input data, a pixel value of at least one target pixel of the plurality of pixels to a register, wherein the register has a bit length of a first bit number, and the first bit number is larger than a second bit number that corresponds to a bit depth of the pixel value of the at least one target pixel;
calculate a register value for the at least one target pixel based on the pixel value inputted to the register; and
generate a seed value of a random number based on the calculated register value.

2. The solid-state imaging device according to claim 1, wherein the processing unit is further configured to:
shift the input data in the register by a third bit number, wherein the third bit number corresponds to a pixel position of the at least one target pixel corresponding to the input data; and
calculate the register value for the at least one target pixel based on the shifted input data.

3. The solid-state imaging device according to claim 2, wherein the processing unit is further configured to:
cyclically shift the input data input to in the register; and
calculate the register value for the at least one target pixel based on the cyclically shifted input data.

4. The solid-state imaging device according to claim 2, wherein the processing unit is further configured to:
invert an order of each bit of the input data based on an inclusion of a set of bits of the input data in a specific range in the register, wherein the inclusion of the set of bits is after the shift; and calculate the register value for the at least one target pixel based on the inversion of the order of each bit of the input data.

5. The solid-state imaging device according to claim 1, wherein the processing unit is further configured to:
   calculate register values for a plurality of target pixels of the plurality of pixels based on pixel values of the plurality of target pixels;
   add the calculated register values for the plurality of target pixels; and
   generate the seed value based on the addition of the calculated register values.

6. The solid-state imaging device according to claim 1, wherein the processing unit is further configured to generate the random number based on the generated seed value.

7. The solid-state imaging device according to claim 6, wherein the processing unit is further configured to generate an electronic signature based on the generated random number.

8. An information processing device, comprising:
an acquisition unit configured to acquire an image signal corresponding to at least one target pixel of a plurality of pixels in a pixel region; and
a processing unit configured to:
   input, as input data, a pixel value of the at least one target pixel to a register, wherein
      the register has a bit length of a first bit number, and
      the first bit number is larger than a second bit number that corresponds to a bit depth of the pixel value of the at least one target pixel;
   calculate a register value for the at least one target pixel based on the pixel value inputted to the register; and
   generate a seed value of a random number based on the calculated register value.

\* \* \* \* \*